United States Patent
Smith et al.

(10) Patent No.: US 9,547,222 B2
(45) Date of Patent: Jan. 17, 2017

(54) METHOD AND APPARATUS FOR CALIBRATION OF MULTIPLE PROJECTOR SYSTEMS

(71) Applicant: University of South Australia, Adelaide (AU)

(72) Inventors: Ross Travers Smith, Highbury (AU); Guy Webber, Rostrevor (AU); Maki Sugimoto, Yokohama (JP); Michael Robert Marner, Modbury (AU); Bruce Hunter Thomas, Wayville (AU)

(73) Assignee: University of South Australia, Adelaide, South Australia (AU)

( * ) Notice: Subject to any disclaimer, the term of this patent is extended or adjusted under 35 U.S.C. 154(b) by 332 days.

(21) Appl. No.: 14/174,109

(22) Filed: Feb. 6, 2014

(65) Prior Publication Data
US 2014/0226167 A1 Aug. 14, 2014

(30) Foreign Application Priority Data
Feb. 8, 2013 (AU) .............................. 2013900409

(51) Int. Cl.
G03B 21/14 (2006.01)
G01B 11/14 (2006.01)
H04N 9/31 (2006.01)
A63F 13/00 (2014.01)

(52) U.S. Cl.
CPC ............. *G03B 21/14* (2013.01); *A63F 13/00* (2013.01); *G01B 11/14* (2013.01); *H04N 9/3147* (2013.01); *H04N 9/3194* (2013.01)

(58) Field of Classification Search
CPC ................................ G03B 21/14; G01B 11/14
USPC ....................... 353/69, 70, 121, 122; 356/614
See application file for complete search history.

(56) References Cited

U.S. PATENT DOCUMENTS 8,038,304 B2 * 10/2011 Mizuuchi ............... G03B 21/14
 348/250
8,042,954 B2 * 10/2011 Tan ....................... H04N 9/3147
 353/121
8,106,949 B2 * 1/2012 Tan ....................... H04N 9/3185
 348/177

(Continued)

OTHER PUBLICATIONS

O. Bimber, D. Iwai, G. Wetzstein, and A. Grundhöfer. The visual computing of projector-camera systems. In Computer Graphics Forum, vol. 27, pp. 2219-2245. Wiley Online Library, 2008.

(Continued)

*Primary Examiner* — William C Dowling
(74) *Attorney, Agent, or Firm* — The Webb Law Firm

(57) ABSTRACT

Disclosed is a method for improving the calibration of multiple projector systems in Spatial Augmented Reality systems where multiple projectors are used to project images directly onto objects of interest. The methods and system described herein improve the calibration of multiple projector systems in order to improve the alignment and clarity of projected images by reducing ghosting that can occur with poorly aligned projectors. The system uses a planar photodiode and the projector is used to project a plurality of projection regions, such as scan lines, across the planar photodetector and calculating the position based on weighting measurements by the measured light intensity and projected images in SAR.

24 Claims, 11 Drawing Sheets

(56) References Cited

U.S. PATENT DOCUMENTS

| | | | | |
|---|---|---|---|---|
| 8,172,407 | B2* | 5/2012 | Lim | G06K 9/2036 353/69 |
| 8,662,676 | B1* | 3/2014 | Chang | H04N 17/002 345/158 |
| 9,134,593 | B1* | 9/2015 | Worley, III | G03B 21/147 |
| 9,372,074 | B2* | 6/2016 | Yamagiwa | G01B 11/14 |

OTHER PUBLICATIONS

O. Bimber and R. Raskar. Spatial Augmented Reality: Merging Real and Virtual Worlds. A K Peters, Wellesley, 2005.

A. Griesser and L. Van Gool. Automatic interactive calibration of multi-projector-camera systems. In CVPRW'06. Conference on Computer Vision and Pattern Recognition Workshop. IEEE, 2006.

Hartley et al.; Multiple view geometry in computer vision, vol. 2. Cambridge Univ Press, 2003.

M. Kojima, M. Sugimoto, A. Nakamura, M. Tomita, M. Inami, and H. Nii. Augmented coliseum: An augmented game environment with small vehicles. In Proceedings of the First IEEE International Workshop on Horizontal Interactive Human-Computer Systems, Tabletop '06, pp. 3-8, Washington, DC, USA, 2006.

D. Koller, G. Klinker, E. Rose, D. Breen, R. Whitaker, and M. Tuceryan. Real-time vision-based camera tracking for augmented reality applications. In Proceedings of the ACM symposium on Virtual reality software and technology, pp. 87-94. ACM, 1997.

J. C. Lee, P. H. Dietz, D. Maynes-Aminzade, R. Raskar, and S. E. Hudson. Automatic projector calibration with embedded light sensors. In Proceedings of the 17th annual ACM symposium on User interface software and technology, pp. 123-126, Santa Fe, NM, USA, 2004. ACM.

J. C. Lee, S. E. Hudson, J. W. Summet, and P. H. Dietz. Moveable interactive projected displays using projector based tracking. In Proceedings of the 18th annual ACM symposium on User interface software and technology, UIST '05, pp. 63-72, New York, NY, USA, 2005. ACM.

R. Raskar, P. Beardsley, J. van Baar, Y. Wang, P. Dietz, J. Lee, D. Leigh, and T. Willwacher. RFIG lamps: interacting with a selfdescribing world via photosensing wireless tags and projectors. In ACM SIGGRAPH 2004 Papers, SIGGRAPH '04, pp. 406-415, New York, NY, USA, 2004. ACM.

R. Raskar, M. S. Brown, R. Yang, W.-C. Chen, G. Welch, H. Towles, B. Seales, and H. Fuchs. Multi-projector displays using camera-based registration. In Proceedings of the conference on Visualization '99: celebrating ten years, VIS '99, pp. 161-168, Los Alamitos, CA, USA, 1999. IEEE Computer Society Press.

R. Raskar, H. Nii, B. deDecker, Y. Hashimoto, J. Summet, D. Moore, Y. Zhao, J. Westhues, P. Dietz, J. Barnwell, S. Nayar, M. Inami, P. Bekaert, M. Noland, V. Branzoi, and E. Bruns. Prakash: lighting aware motion capture using photosensing markers and multiplexed illuminators. In ACM SIGGRAPH 2007 papers, SIGGRAPH '07, New York, NY, USA, 2007. ACM.

R. Raskar, G. Welch, and W. Chen. Table-top spatially-augmented realty: bringing physical models to life with projected imagery. In Augmented Reality, 1999.(IWAR'99) Proceedings. 2nd IEEE and ACM International Workshop on, pp. 64-71. IEEE, 1999.

R. Raskar, G. Welch, K. Low, and D. Bandyopadhyay. Shader lamps: Animating real objects with Image-Based illumination. In Rendering Techniques 2001: Proceedings of the Eurographics, pp. 89-102, 2001.

M. Sugimoto, K. Kodama, A. Nakamura, M. Kojima, and M. Inami. A display-based tracking system: Display-based computing for measurement systems. In Proceedings of the 17th International Conference on Artificial Reality and Telexistence, ICAT '07, pp. 31-38, Washington, DC, USA, 2007. IEEE Computer Society.

J. Summet and R. Sukthankar. Tracking locations of moving handheld displays using projected light. In Proceedings of the Third international conference on Pervasive Computing, Pervasive'05, pp. 37-46, Berlin, Heidelberg, 2005. Springer-Verlag.

R. Yang, D. Gotz, J. Hensley, H. Towles, and M. S. Brown. Pixelflex: a reconfigurable multi-projector display system. In Proceedings of the conference on Visualization '01, VIS '01, pp. 167-174, Washington, DC, USA, 2001. IEEE Computer Society.

Z. Zhang. A flexible new technique for camera calibration. Pattern Analysis and Machine Intelligence, IEEE Transactions on, 22(11):1330-1334, 2000.

S. Zollmann and O. Bimber. Imperceptible calibration for radiometric compensation. Proceedings Eurographics 2007, Short Paper, 2007.

S. Zollmann, T. Langlotz, and O. Bimber. Passive-active geometric calibration for view-dependent projections onto arbitrary surfaces. JVRB—Journal of Virtual Reality and Broadcasting, 4(2007)(6), 2007.

* cited by examiner

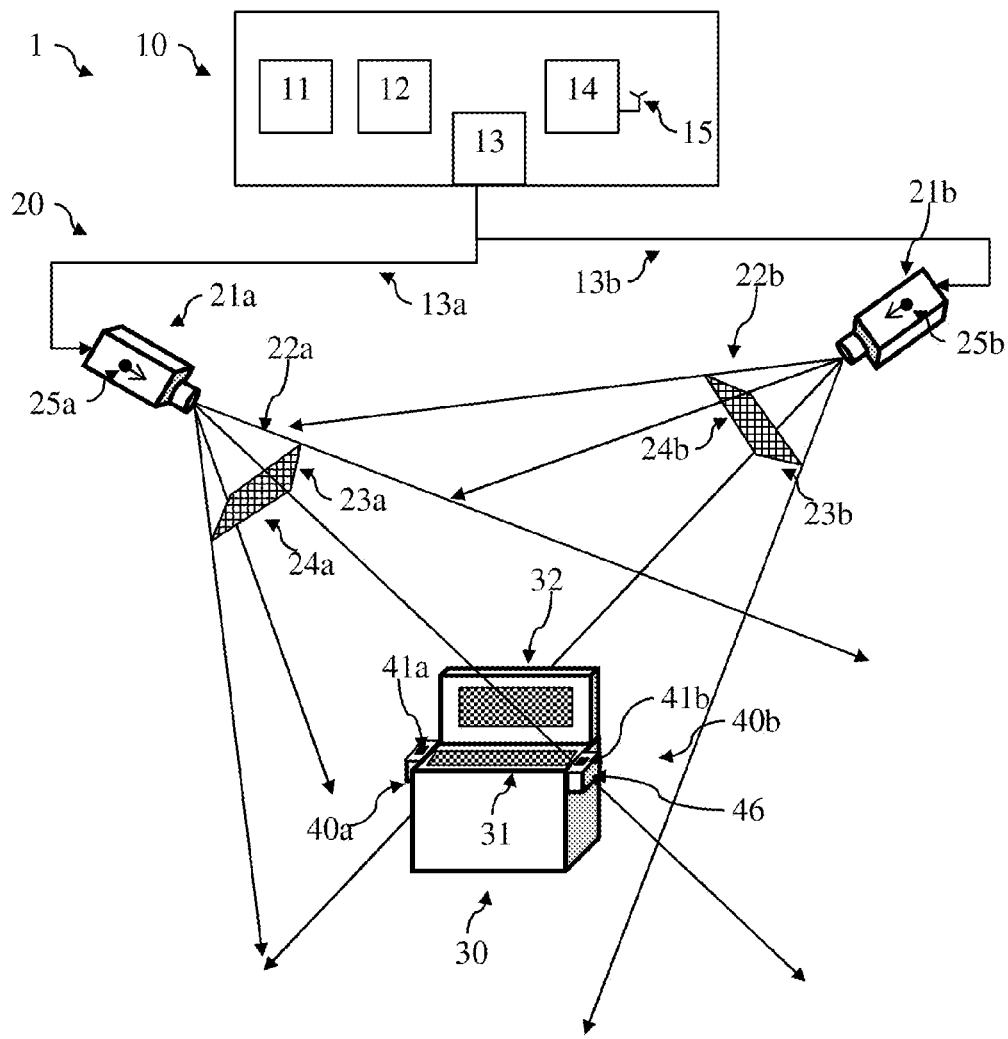
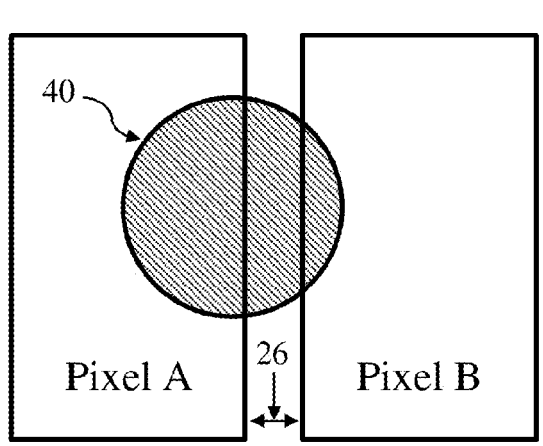
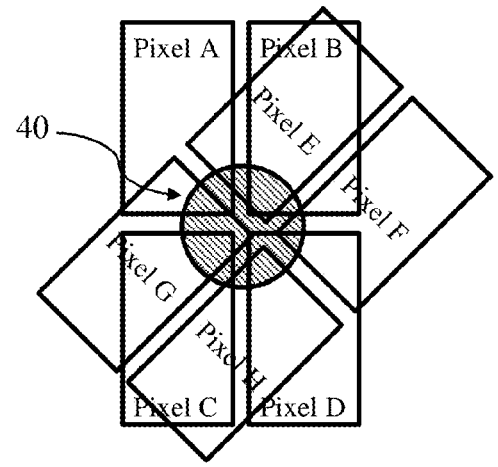
Figure 2A          Figure 2B

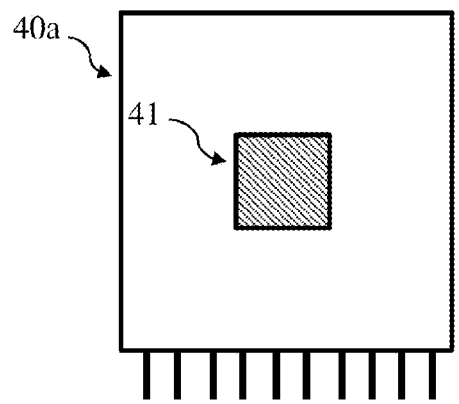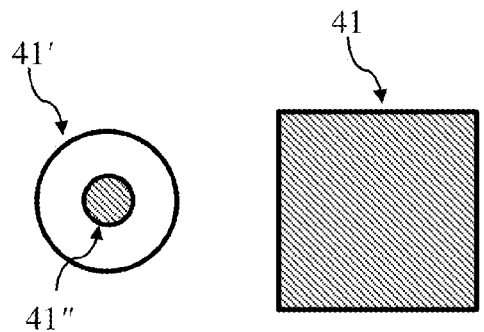
Figure 3A                              Figure 3B
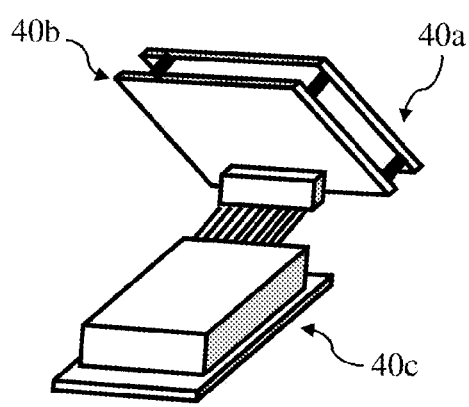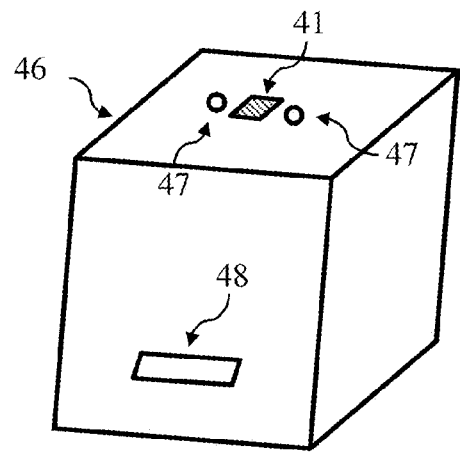
Figure 3C                              Figure 3D
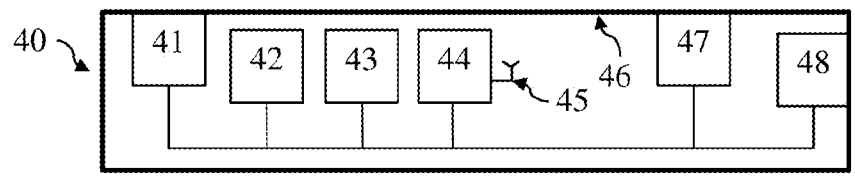
Figure 4

METHOD AND APPARATUS FOR CALIBRATION OF MULTIPLE PROJECTOR SYSTEMS

PRIORITY DOCUMENT

The present application claims priority from Australian Provisional Patent Application No 2013900409 titled "METHOD AND APPARATUS FOR CALIBRATION OF MULTIPLE PROJECTOR SYSTEMS" and filed on 8 Feb. 2013, the entire content of which is hereby incorporated by reference.

TECHNICAL FIELD

The present invention relates to spatial augmented reality. In a particular form, the present invention relates to calibration of projectors in spatial augmented reality systems.

BACKGROUND

Augmented Reality (AR) is the addition of digital imagery and other information to the real world by a computer system. AR enhances a user's view or perception of the world by adding computer generated information to their view. Spatial Augmented Reality is a branch of AR research that employs projected light to present perspective corrected computer graphics that directly illuminate physical objects to enhance their appearance. In addition to using multiple projectors to projects information directly onto objects of interest, SAR systems can also use tracking systems and sensors to build up a three dimensional (3D) model of the SAR environment, and can track movement of real world objects. Such movements or changes are integrated into the 3D model so that updates can be made to projections as objects are moved around.

One application of SAR is for developing and evaluating user interfaces for workstations, as well as the layout of workstations in a control room. In these applications a simple substrate, or physical prototype, can be constructed with the desired shape for each workstation, or piece of a workstation. SAR can be used to visualize different control features on each physical prototype and different physical placements of the workstations. Users can directly interact with the augmented substrate without having to wear or hold a display device, and the projected information can be viewed by multiple people at the same time. Multiple projectors are often used to reduce shadows while users interact with the workstation, or to provide complex or extended displays.

In such systems where multiple projectors are used, calibration must be performed to ensure alignment of projected images. A calibration process is required to calculate both the intrinsic parameters of the projector, such as the horizontal and vertical field of view, and the extrinsic parameters, such as the projector's position and orientation relative to the world. This is commonly accomplished by matching projector pixels with known 3D points in the world, such as features on a physical object.

These correspondences can be found manually with a projected crosshair visually displayed on the physical object using a keyboard or mouse for adjustment, as used with Shader Lamps. This process can be automated. One approach to projector calibration is to employ a calibrated camera. These projector-camera systems allow for real-time image adjustment that allows images to be displayed onto surfaces that are not traditionally designed for projections, such as non-planar geometry and textured surfaces.

A second method of projector calibration employs photo detectors to find projector alignment. Several research projects have proposed projector based position detection employing photo detectors in a projection volume. These photo detector based measurements allow a direct mapping between the real environments and projection information without consideration of a camera coordinate system. These have included structured light approaches known as Gray-coding which uses a sequence of images to find the pixel locations of the photo detectors, on the basis that a portion of a display surface illuminated by multiple projectors will be brighter. Once the projector-world correspondences are found, the calibration parameters for the projector can be calculated. An algorithm for calculating these parameters is described in detail by O. Bimber and R. Raskar, Spatial Augmented Reality: Merging Real and Virtual Worlds. A K Peters, Wellesley, 2005[1].

However, despite the extensive research, there are still a number of limitations that prevent the flexibility and performance required for multi-projector SAR systems. Current point based photo detectors can only locate positions with pixel accuracy, and thus images can appear ghosted and mis-aligned.

There is thus a need to provide improved methods and apparatus for estimating locations with sub-pixel accuracy to allow calibration and alignment of multiple projectors in SAR systems, or to at least provide users with a useful alternative.

SUMMARY

According to a first aspect, there is provided a method for estimating a location of a photodetector in a projector based two dimensional coordinate system, the projector projecting a two dimensional array of pixels and the photodetector comprising a sensing area, the method comprising:

projecting a plurality of projection regions and taking a photodetector measurement for each projection region, wherein the projected area of each projection region on the photodetector is less than the sensing area of the photodetector; and estimating the location of the photodetector in the projector based two dimensional coordinate system using a weighted mean of the locations of the projection regions, wherein the location of each projection region in the projector based two dimensional coordinate system is weighted by the photodetector measurement for the respective projection region.

In one form, estimating the location of the photodetector further comprises the step of combining one or more of the plurality of projected regions into one or more scanning set, wherein a scanning line for each scanning set is defined based upon the locations of the one or more of the projected regions comprising the scanning set, and the combined projected area on the photodetector is less than the sensing area of the photodetector, and the photodetector measurements are combined to generate a photodetector set measurement. In one form, estimating the location of the photodetector further comprises the step of combining a plurality of scanning sets to form two or more scanning collections, wherein for each scanning collection, the scanning lines of the scanning sets forming the scanning collection are substantially parallel, and define a scanning direction line which is substantially orthogonal to the scanning lines. In one form, for each scanning collection, a measurement set location is defined for each scanning line in the scanning collection by the intersection of the scanning direction line with the respective scanning line. In one form, estimating the location of the photodetector in the projector based two dimensional coordinate system is performed using a weighted mean of the locations of the measurement set locations of a scanning collection, wherein the location of each measurement set location is weighted by the photodetector set measurement for the respective measurement set locations.

In one form, the two or more scanning collections include a first scanning collection and a second scanning collection, and the scanning direction line of the first scanning collection is substantially parallel to a first axis of the projector based two dimensional coordinate system, and the scanning direction line of the second scanning collection is substantially parallel to a second axis of the projector based two dimensional coordinate system, and the coordinate of the photodetector on the first axis is estimated from the measurement set locations and photodetector set measurements of the first scanning collection, and the coordinate of the photodetector on the second axis is estimated from the measurement set locations and photodetector set measurements of the second scanning collection.

In one form, each projection region is a line of pixels aligned with one of the axes of the two dimensional array of pixels and each line is a scanning set and each scanning collection is comprised of a plurality of projected lines separated by a scanning step in the scanning direction line. In one form, the coordinate of the photodetector on the $i^{th}$ axis, where the $i^{th}$ axis is the first axis or the second axis, is obtained using the equation:

$$mpp_i = \frac{\sum_{n=1}^{N} measurement\_set\_location_{n,i} * photodetector\_set\_measurement_n}{\sum_{n=1}^{N} photodetector\_set\_measurement_n}$$

where $mpp_i$ is the coordinate of the photodetector on the $i^{th}$ axis, measurement_set_location$_{n,i}$ is the $i^{th}$ coordinate of the measurement set location of the $n^{th}$ scanning set in the scanning collection, and photodetector_set_measurement$_n$ is the photodetector set measurement for the $n^{th}$ scanning set in the scanning collection, and N is the number of scanning sets in the scanning collection.

In one form, the width of the each line of pixels is one pixel wide.

In one form, the method further comprises a step of obtaining a coarse estimate of the photodetector location prior to the step of projecting a plurality of projection regions, and each scanning collection is obtained by projecting a plurality of lines over a range from a start pixel location to an end pixel location, wherein the start pixel location is a pixel location estimated from the coarse location to be before the edge of the photodetector and the end pixel location is a pixel location estimated from the coarse location to be after an opposite edge of the photodetector.

In one form, the method further comprises the step of background correcting the photodetector measurements. In one form, the step of background correcting the photodetector measurements comprises:

measuring one or more background light measurements when the photodetector is not illuminated by the projector to obtain a background estimate; and subtracting the background estimate from each photodetector measurement.

In one form, the estimated location of the photodetector is the centroid of the sensing area.

In one form, at least one of the plurality of projection regions partially illuminate the sensing area.

In one form, the photodetector is a composite photodetector comprised of a plurality of light sensing elements, the projected area of each projection region on the photodetector is less than the sensing area of each light sensing element. In one form, the photodetector is a composite photodetector comprised of a plurality of light sensing elements, wherein the gap between each of the light sensing elements is less than 10% of the width of the projected area of each projection region on the photodetector.

According to a second aspect, there is provided a method for calibrating a multiple projector system to align a plurality of projectors, the method comprising:

receiving a physical location of a photodetector;

pairing each physical location with a location in a virtual model of the multiple projector system;

estimating the pixel based location of a photodetector using the method of the first aspect for each of the plurality of projectors; and aligning the plurality of projectors from the estimated pixel based location for each of the plurality of projectors.

In a further form, the step of aligning comprises adjusting at least one extrinsic parameter of at least one of the plurality of projectors. The at least one extrinsic parameter may comprise a position and orientation of the projector in the virtual model of the multiple projector system.

In a further form, the calibration is performed continuously during use of the multiple projector system to maintain alignment of the plurality of photodetectors.

In one form, the multiple projector system is a spatial augmented reality (SAR) system.

According to a third aspect, there is provided a photodetector for use in a calibrating a multiple projector system, comprising:

a housing;

a light sensor comprising a sensing area;

a signal processing module for generating a multiple projector measurement from the light sensor;

a power supply module; and a communications module.

In a further form, the perimeter of the sensing area is a simple equiangular polygon. The polygon may have 180° rotational symmetry. In a further form, the light sensitivity of the light sensor is substantially uniform across the sensing area. In one form, the light sensor is a planar photo diode. In a further form, the light sensor is a composite light sensor and the sensing area is comprised of a plurality of sensing elements. In a further form, the signal processing module comprises an Analogue to Digital Converter (ADC). The signal processing module may comprise a microprocessor for digitising and storing the light intensity measurements.

In a further form, the communications module implements a wireless protocol for wirelessly transmitting the light intensity measurement.

In a further form, the power supply module comprises a rechargeable battery and a port for supplying external power to charge the rechargeable battery.

In a further form, the light sensor is located in a top surface of the housing. The top surface may further comprise one or more LEDs in the top surface. The housing may be a cube.

The methods may be embodied in a non-transitory processor readable medium comprising instructions for causing at least one processor to perform one of the methods described herein. Similarly, a system may be provided comprising a projector, a photodetector, and a computing apparatus comprising at least one processor and a memory comprising instructions for performing one of the methods described herein.

BRIEF DESCRIPTION OF DRAWINGS

A preferred embodiment of the present invention will be discussed with reference to the accompanying drawings wherein:

FIG. 1 is a schematic diagram of a SAR system according to an embodiment;

FIG. 2A is a diagram illustrating the overlapping of two projected pixels over a point based photo detector and FIG. 2B is a diagram illustrating the overlapping of eight projected pixels from two projectors over a point based photo detector;

FIG. 3A illustrates a photodetector board comprising a planar photodiode, FIG. 3B illustrates the size of the planar photo diode of FIG. 3A on the right compared to a point photodetector and lens arrangement on the left, FIG. 3C illustrates the internal electronic components of a photodetector, and FIG. 3D illustrates a photodetector cube comprising a housing that houses the internal electronic components shown in FIG. 3C with cut outs for the photodiode and USB connector according to an embodiment;

FIG. 4 is a block diagram of a photodetector according to an embodiment;

In the following description, like reference characters designate like or corresponding parts throughout the figures.

DESCRIPTION OF EMBODIMENTS

Figure 5A:
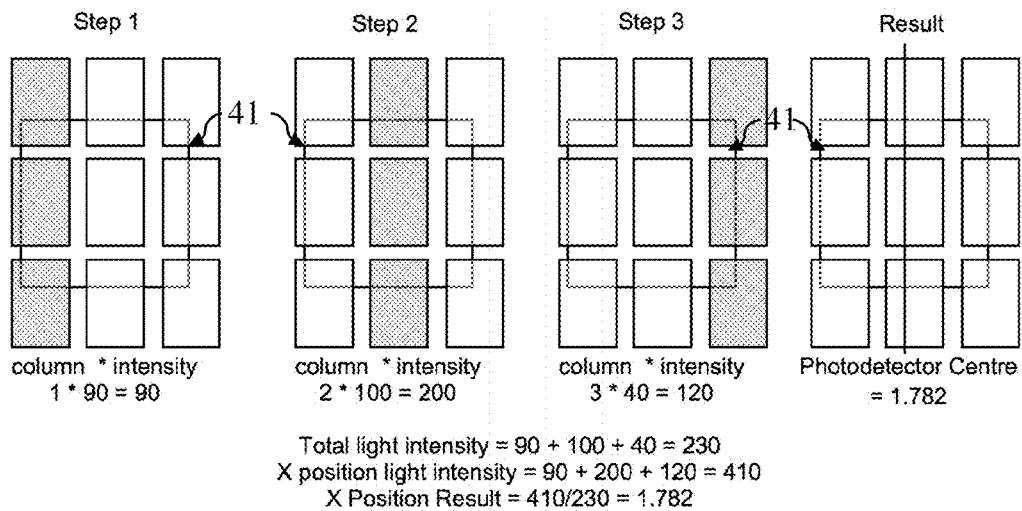
FIG. 5A is an illustration of a sub-pixel calculation with the photo detector biased to the left of the pixels (FIG. 5A)

Embodiments will now be described which present a new calibration method and hardware to improve multiple projector calibration using photo detectors to support multiple projector systems including Spatial Augmented Reality (SAR) systems. Further, this method can be automated so that the system can make fine adjustments to correct the appearance in real-time (or near real time) to ensure alignment is maintained as users, surfaces, and/or photodetectors move, are bumped, or the projector positions drift.

These embodiments build upon existing calibration methods that employ point-based photo detectors by advancing the hardware with a larger surface area photo detector to locate sub-pixel position with light intensity data. The data from this new photodetector is used to improve upon the prior art Gray-coding algorithm to improve the position measurement. The novel hardware allows a sub-pixel position to be calculated and this is leveraged to improve alignment of multiple-projector environments. The results show the new approach improves position measurement from pixel accuracy using a point photo detector with Gray-code algorithm by an order of magnitude providing sub-pixel accuracy by leveraging a planar photo detector (or alternatively a photo detector with a sensing area larger than the projected pixel size) and additional algorithm steps.

FIG. 1 is a schematic diagram of a SAR system 1 according to an embodiment. The SAR system comprises a computer 10, a projection system 20, a target object 30, and photodetectors 40. The computer comprises a processor 11 and a memory 12 for generating the images and receiving sensor input, an Input/Output (I/O) interface 13 and a communications module 14 for communication with photodetector 40 over a wireless communications link 15. The projection system comprises a first projector 21a and a second projector 21b, connected to the computer 10 via connections 13a and 13b. The first projector has a field of view 22a which is comprised of a two dimensional array of pixels having a horizontal dimension (or field of view) having a first horizontal number of pixels 23a and a vertical dimension having a first vertical number of pixels 24a. The projector has a first position and first orientation 25a in the physical (real-world) space. Similarly, the second projector has a field of view 22b which is comprised of a two dimensional array of pixels having a horizontal dimension (or field of view) having a second horizontal number of pixels 23b and a vertical dimension having a second vertical number of pixels 24b. The projector has a second position and second orientation 25b in the physical (real-world) space. The projectors project images 31 32 onto the surface of the target object 30. A first photodetector 40a with a sensing element 41a is located on one side of the target object 30, and a second photodetector 40b with a sensing element 41b is located on an opposite side of the target object 30 in housing 46.

The Gray-coding calibration processes projects a sequence of images onto the photo detectors to estimate the pixel locations of the photo detectors. Existing point sized photo detectors use a spherical lens 41" above a photo (sensing) element 41' as illustrated in FIG. 3B. We will refer to this design as a point sized detector. A limitation of this approach when capturing projected light is the hardware is unable to capture the details of an entire pixel clearly. One reason for this is the photo detector's lens may capture projected light information from multiple pixels as shown in FIG. 2A. Additionally, the gap between the two pixels 26, called the 'screen door', is also incorporated into the combined light intensity measurement.

Once the projector-world correspondences are found, the calibration parameters for the projector can be calculated (eg horizontal and vertical field of view, and projectors position and orientation 25a, 25b). One algorithm for calculating these parameters is described in detail by Bimber and Raskar [1] the contents of which is hereby incorporated by reference. However, as previously discussed, structured light approaches such as Gray-coding only provides pixel level accuracy which can lead to ghosting. A reason for this occurring is that in practice when Gray-coding is performed two pixels may overlap a point based photo detector. FIG. 2A illustrates the overlapping of two projected pixels (Pixel A and Pixel B) over a point based photo detector 40. In this example it is clear that pixel A has a greater overlap, but during standard Gray-coding operations both pixels will be determined to be in this position. For this reason current algorithms employing Gray-coding do not render down to single pixel lines (ie they only provide pixel level accuracy). Similarly, FIG. 2B depicts the case of two overlapping projectors with overlapping of 8 pixels. Pixels (A, B, C, and D) from a first projector 21a overlap the pixels (E, F, G, and H) from a second projector 21b. Depending upon the light threshold of the photodetector, all eight pixels could be detected and registered with the photo detector 40.

Embodiments will be described which determine the location of a photo detector to a fraction of a pixel (ie sub-pixel) in projector based two dimensional coordinate system, such as that defined by the two dimensional array of pixels projected by a projector. The estimated location may be a reference point on the photodetector such as the physical centre of the photodetector or the sensing area, or other reference points such as the edges of the sensing area. The projector is used to project a plurality of projection regions onto the photodetector and a photodetector measurement is taken for each projection region. The projected area of each projection region on the photodetector is less than the sensing area of the photodetector. A projection region is a set of pixels, which will typically be contiguous pixels, and thus as the source to the projector the location of each the projected region in the projector based two dimensional coordinate system is known. These regions may each be a line of pixels, or a set of regions can be grouped to form a line, and the regions (or sets of regions) may be scanned across the photodetector to form a scanning collection of lines. The location of the photodetector (in the projector based two dimensional coordinate system) is estimated using a mean of the known locations of the projected regions after weighting each by the photodetector measurement for that respective projection region (ie a weighted mean of the locations of the projection regions). The photodetector measurement used in the weighting may be a measurement corresponding to, or associated with each region, or a set of regions. As will be shown below, this approach can be viewed as estimation of the weighted location in which the scan line positions are weighted based on the intensity measurements, or alternatively as the step position of a scan line weighting the normalised light intensity measurements (normalised to the total light intensity measurements across the photo detector). This is mathematically equivalent to a centre-of-mass based measurement of intensity relative to the photo detector's surface (ie a centre of intensity estimate or light barycentre). For a simple equiangular or regular polygon the mean position estimate corresponds to the centroid of the sensing area. In one embodiment the method calculates the fractional pixel position of the photo detector's geometric centre by determining the line, perpendicular to the pixel axis, which marks the division of the sensing area in to two halves that have equal summed light sensitivity. This line therefore bisects the sensing area and passes through the geometric centre of the sensing area. Providing sub-pixel accuracy allows for more accurate alignment of pixels to the photo detectors position. Multiple projector systems including SAR environments with multiple projectors, maintain a three dimensional model of the environment, this enables particular pixel pairs from the two projectors to be assigned together (or associated with each other). For example in the case illustrated in FIG. 2B, Pixels C and G can be defined as overlapping along with H and D.

One aspect of current photo detector calibration systems that was further developed was the selection of the light sensitive element employed to support projector calibration. To overcome the limited surface area of the point sized photo detector 41", shown in the left of FIG. 3B, a photodetector was developed that used a planar photodiode with a comparatively larger surface area. This large surface area allowed an entire pixel to fit on the photodiodes surface. Further, the photodetector (or photodetector module) was designed as a portable independent device. Current systems employ photo detectors that are permanently fixed to objects and are not designed to be generically applied to arbitrary objects. For example, in J. C. Lee, P. H. Dietz, D. Maynes-Aminzade, R. Raskar, and S. E. Hudson. "Automatic projector calibration with embedded light sensors", in Proceedings of the 17th annual ACM symposium on User interface software and technology, pages 123-126, Santa Fe, N. Mex., USA, 2004, Lee et al. attach photo detectors to the four corners of a planar cardboard display area using custom electronics and fixed wiring. This design requires that electronics and wiring are adapted for each object that requires registration with the projector system.

FIGS. 3A to 3D illustrate an embodiment of a photodetector (also referred to as a photodetector module or calibration cube), and FIG. 4 illustrates a block diagram of the various components of the photodetector. The photodetector 40 comprises a light sensor with a sensing area 41 which in the embodiment illustrated in FIGS. 3A to 3D is a planar photodiode. However, other light sensors with a sensing area could be utilised such as photodiode array, photo-resistor, photovoltaic sensor, a photomultiplier (PMT) or Charge Coupled Device (CCD). However, such devices are typically more expensive, and larger and thus less desirable from a portability and cost point of view. However, there may be applications where such issues are not of significant concern, or current devices may be improved to address these issues, and thus they may be used in place of a planar photodiode. The perimeter of the sensing area may be a simple equiangular polygon (eg triangle, square, rectangle, hexagon, etc). The polygon may have 180° rotational symmetry and may be a regular polygon. In this case, the geometric centre or centroid of the sensing area can be readily related to the physical position of the photodetector. The sensing area may be a single sensing area, or the light sensor may be a composite light sensor which includes a plurality of sensing elements. These may be provided as sensor array. Preferably the light sensitivity of the light sensor is substantially uniform across the sensing area (whether a single sensor or a composite sensor). Alternatively, if the light sensitivity is not substantially uniform then light intensity measurements can be normalised or calibrated to account for known variations. The area or size of the sensing element is determined based upon requirement that in use the sensing element is larger than the projected pixel size at the location the photodetector is placed. This choice may be made using the expected resolution of the projection system. If a composite sensor is used the width of the projected line at the photodetector should be less than the width of each light sensing element or alternatively the gap between each of the light sensing elements should be is less than 10% of the width of the projected line at the photodetector. A range of photodetectors could be produced, each with different size sensing elements to cater for a range of projection environments.

The photodetector further comprises a signal processing module 42 for generating a measurement from the light sensor. For clarity this will be referred to as a light intensity measurement. The term sensing element will also be used to refer to the light sensor, and for ease of description, and unless the context suggests otherwise, the term will be used to include a composite sensor comprising multiple sensor elements. This may be a microprocessor or microcontroller along with other components such as amplifiers, filters, etc, for generating a light intensity signal. In some embodiments, an analogue to digital (ADC) converted is used to produce a digital light intensity measurement. The light intensity measurement may be a single measurement or it may be an average of several measurements. Averaging may be performed in hardware (ie through the use of an integrator circuit) or software (average of digital samples). The photodetector also comprises a power supply module 43. The power supply module could be a wired module in which power is supplied by an external source, or the power supply module can comprises a battery and include associated electronics for charging the battery and for providing power to the signal processing module and other components. In one embodiment the power supply module comprises a port such as a USB connector for supplying external power to recharge the battery. The photodetector also comprises a communications module 44 for communicating the light intensity measurements to the SAR computer 10. In some embodiments, the communications module comprises a transmitter 45 for transmitting the light intensity measurements using a wireless communications protocol such as ZigBee, Bluetooth, IRDA, etc. In another embodiment, a connector and wired connection is used to transmit the light intensity measurements. Light intensity measurements maybe transmitted in real time, near real time, or within some time window of a trigger signal being detected (eg a signal above a threshold intensity). Individual light intensity measurements may be combined. For example, multiple samples over a time window may be combined into a single measurement, or in the case of a composite sensor the multiple measurements may be combined into a single measurement. Alternatively, the photodetector may further comprise a memory which is used to store measurements which can then be transmitted or downloaded at a later time. A clock may also be provided to time stamp measurements.

A housing 46 such as cube may be used to house the photodetector. The light sensor may be located in a top surface of the housing. One or more LED's 47 may also be provided on the surface of the housing to indicate photodetector status, or to assist with camera calibration. In this case the LEDs may be placed on the top surface adjacent or near the light sensor, such as is illustrated in FIG. 3D. The photodetector may simply be placed on a desired surface, mounted using an external mounting apparatus or the housing may also include an integral mounting apparatus for mounting to a surface, such as a magnet, clamp, threaded fastener (eg screw), Velcro, etc. A wired port connector 48, such as USB connector may be provided in one side of the housing for recharging of the battery and/or communication with the microcontroller. Providing wireless communications, a rechargeable battery and compact housing enable the provision of a portable photodetector. A switch may also be provided to isolate the battery if the device is to be unused for a period of time.

An embodiment of a portable photodetector was developed for use in a SAR system in which the projected pixels on the target surfaces were approximately 1.5 mm×1.5 mm FIGS. 3A to 3D illustrate various embodiments of the portable photodetector. A Silonex SLCD-61N2 planar photodiode 41 was selected and is shown in FIG. 3A on photodetector board 49a. The photodetector has a 21.4 sq mm sensitive area (5.1 mm×5.1 mm minus the solderable contact area). This allows at least one pixel and the surrounding screen door information to be captured in most common cases (eg based on the nominal pixel size of 1.5 mm×1.5 mm). However, as would be understood the planar photodiode can be selected to support larger size pixels as required (or variants with larger sensing elements or using a composite sensor may be manufactured). FIG. 3B illustrates the size of the planar photo detector 41 (on the right) compared to a point photodetector 41" and lens 41' arrangement on the left. The size of the point photodetector is indicated by the black circle on the lens. The planar photo detector response is amplified with an opamp (Microchip MCP601) configured to 10 times gain. The resulting signal is measured using the internal 10 bit ADC of a microprocessor (Atmel 328P) on an Arduino Pro Mini board manufactured by SparkFun Electronics. The measured light intensity (digital) value is transmitted over a wireless communications channel (Xbee 1 mW 802.15.4 stack) to a host PC. A 110 mA hour LiPo battery with a basic charge circuit using USB power is used to power each calibration node. Two CREE LEDs were also placed near the photo detector for camera calibration support. The internal electronic components can be seen combined in FIG. 3C showing the photodetector board 49a, the processor board 40b (including the Arduino Pro Mini board) and the communications board 49c (including the Xbee transmitter chip). All electrical components were enclosed in a 40 mm×40 mm×40 mm 3D printed ABS plastic housing 46 in the shape of a cube as depicted in FIG. 3D.

In parallel with the development of a planar photodetector, a method for estimating the location of a photodetector in a two dimensional array of pixels projected by a projector was developed to achieve estimates accurate to the sub-pixel level. This method extended the structured light approaches such as the Gray-coding calibration method to provide an order of magnitude improvement over existing photodetector based multi-projector alignment methods. Embodiments will be described which determine the location of a photo detector to a fraction of a pixel (ie sub-pixel) in a coordinate system based upon two dimensional array of pixels projected by a projector. To assist in understanding the method, a simplified example embodiment of a method for estimating a location of a photodetector in a two dimensional array of pixels projected by a projector will first be outlined.

The resulting solution is presented in a pixel coordinate system with the position of the photo detector being defined by two floating point values X and Y which are the (sub) pixel based position of the centre of the photo detector (or sensing element). Whole number values are the centres of the projected pixels. The algorithm returns the centre of the photo detector in the pixel coordinate system. The algorithm assumes the pixel area is no larger than the photo detector area. The first step comprises determining a coarse position appropriate to the apparent size of the sensor, for example within about three pixels using a Gray-code image sequence in both 'X' and 'Y' axes. Coarser estimates can be obtained provided the largest error is known so the subsequent fine scans can be performed that cover the full surface of the photodetector.

Next the precise 'X' position is estimated. This is performed by scanning a one pixel vertical line left to right across the photo diode measuring the light level at each step. The scan starts from beyond the left edge of the photo diode and extends beyond the right edge of the photo diode. The 'X' pixel position of the mean centre of the measured received light starts once the scan line enters the photo detector, this position is calculated using the following equation:

$$mpp = \frac{\sum_{n=1}^{steps} steppixelposition_n * measuredlightlevel_n}{\sum_{n=1}^{steps} measuredlightlevel_n} \quad (1)$$

where mpp is the estimated pixel position of the photodetector, $steppixelposition_n$ is the pixel position of the line for the $n^{th}$ scan step, and $measuredlightlevel_n$ is the light intensity measurement for the $n^{th}$ scan step. This is subject to the condition that the number of steps*Pixel area is ≥sensor area. The measured light level may be a background adjusted light level. Background adjustment may be performed prior to estimating the location of the photodetector using equation (1). Background adjustment may be performed by measuring one or more background light measurements at the photodetector when a scan line is not projected over the detector to obtain a background estimate. If multiple measurements are taken these can be combined into a single background estimate (for example by using a mean of the measurements, including a robust mean). This background estimate can then be subtracted from each light intensity measurement. That is the $measuredlightlevel_n$ may be an excess light level above background level.

Next the precise 'Y' position is estimated. Similar to the 'X' position, the scanning is performed on a one pixel horizontal line top to bottom across the photo measuring the light level at each step. The scanning also starts from beyond the top edge of the photo diode and extends to beyond the bottom edge of the photo diode. The 'Y' pixel position of the average centre of the measured received light is calculated using equation (1).

The calculation is analogous to finding the position of the centre of masses (with mass being replaced by intensity in this case). The centre of mass R with continuous mass density p(r) is given by:

$$R = \frac{1}{M} \int p(r) r dV \quad (2)$$

Equation (3) is the discrete case M total mass $m_i$ is the mass at one point and $r_i$ is the position. The similarity can be seen between Equation (2) and (3).

$$R = \frac{1}{M} \sum m_i r_i \quad (3)$$

This approach is also mathematically equivalent to calculating a weighted mean of the scan step locations in which each scan step position is weighted by the light intensity measurement for the respective scan step. The weighted mean is thus:

$$\bar{x} = \frac{\sum w_i x_i}{\sum w_i} \quad (4)$$

In this case, the $w_i$ are the intensity measurements, and $x_i$ are the scan positions in pixel coordinates. The method thus calculates the fractional pixel position of the photo detector's geometric centre by determining the line, perpendicular to the pixel axis, which marks the division of the sensing area in to two halves that have equal summed light sensitivity. This line therefore bisects the sensing area and passes through the geometric centre of the sensing area.

Figure 5B:
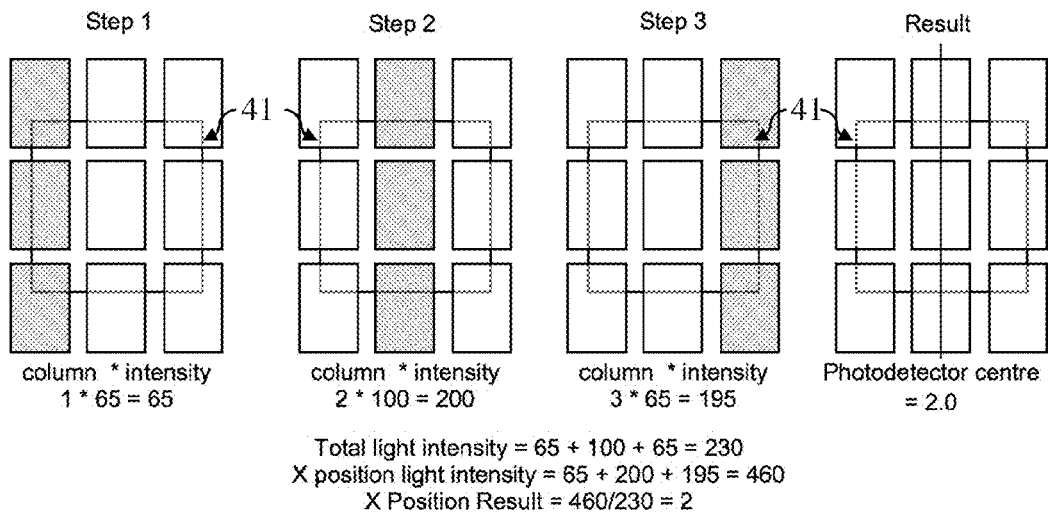
FIG. 5B is an illustration of a sub-pixel calculation with the photo detector in the centre of the pixels.
Figure 5C:
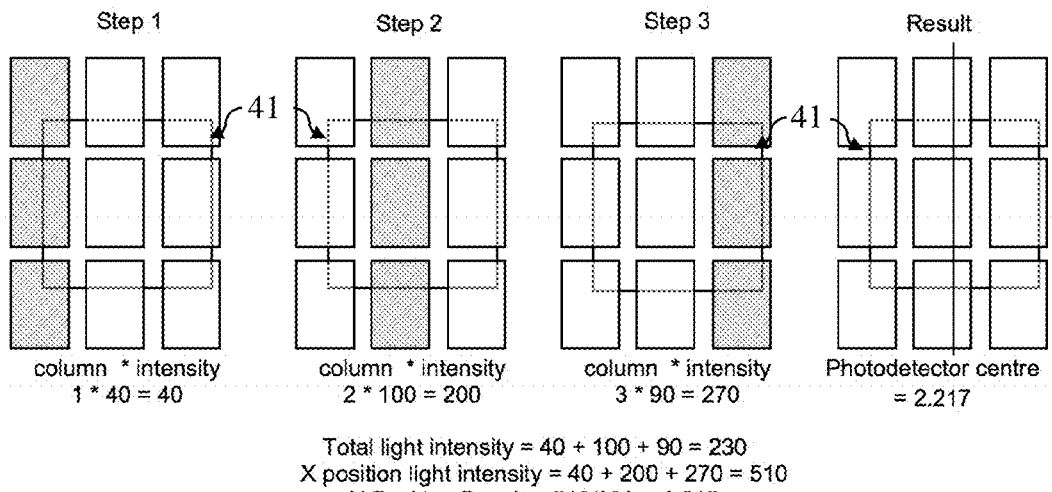
FIG. 5C is an illustration of a sub-pixel calculation with the photo detector biased to the right of the pixels.

To further describe the steps in the sub-pixel calculation FIGS. 5A to 5C visually depicts three examples of the 'X' position calculation with the photo-diode biased to the left, centre and right position. For ease of understanding, the sensor area is aligned to the projected pixels, but it is to be understood that the method does not depend upon this and in practice any alignment (or orientation) is possible. The scan lines representing illuminated pixels are depicted with the small gray rectangles on the planar photo detectors surface (the large square). We present three illumination examples to describe the algorithms operation, for each example a vertical bar is swept over the surface of the photo-detector. The algorithm begins once the first group of pixels illuminates the photo detector. FIG. 5A demonstrates a sub-pixel calculation with the photo detector biased to the left of the pixels. A one pixel wide scan line is scanned across the planar photodiode 41 in three scan steps x=(1, 2, 3) and light intensity measurements I=(90, 100, 40) are obtained. The weighted mean position is then estimates as (90*1+100*2+40*3)/(90+100+40)=410/230=1.782. FIG. 5B presents an example with the photo detector centred relative to the pixels. In this case the light intensity measurements are I=(65, 100, 65) giving a weighted mean position of (65*1+100*2+65*3)/(65+100+65)=460/230=3.0. FIG. 5C provides a right biased example. In this case the light intensity measurements are I=(40, 100, 90) giving a weighted mean position of (40*1+100*2+90*3)/(40+100+90)=510/230=2.217. For each example only the X position depicted however similar scanning and calculations would be performed in the Y direction.

In this embodiment, a coarse estimate is first obtained eg using a structured light approach such as the Gray-code algorithm, which is accurate to 3 pixels. Structured light approaches use gradient patterns or other variations in light intensity and position such as small blocks of contiguous pixels to allow estimation of the approximate locations. Further, each scanning step is performed over a limited range from a start pixel location to an end pixel location. The start pixel location is a pixel location estimated from the coarse location to be before the edge of the photodetector and the end pixel location is a pixel location estimated from the coarse location to be after an opposite edge of the photodetector. However other embodiments or variations are possible. The preliminary step of obtaining a coarse estimate could be omitted, and scanning could simply start from the left most pixel (position 1) of the projector and proceed to the right most pixel of the projector (position N; assuming a left to right scan direction). Light intensity data for each scan step over the entire scanning range 1 . . . N could be stored and following a scan the scan step corresponding to the maximum intensity value identified, for example the jth pixel $N_j$. Estimation of the position could then be performed using only the scan positions and light intensity measurements in a window surrounding the maximum value, such as j−3 . . . j+3 (thereby reducing any noise contributions). The limits of the window may be based upon the known or estimated width of the sensor area, or it may be determined based upon the background light level (ie all values above background are used) or other threshold (eg 1 standard deviation above the background, or 1%, 5%, or 10% of the peak etc). Further scanning need not proceed in a strictly left to right or right to left manner. For example the scan could start in the estimate middle and move to the left edge, and then start at a position of middle+1 and move to the right edge. Staggered scans could also be made. For example if the middle is at position 0 and the sensor is from −2 to +2, then a sequence of alternating outward scans (eg 0, +1, −1, +2, −2, +3, −3) could be performed. The order could also be random. For example (−2, +3, 0, +1, −1, +2, −3).

In the embodiment described above the first scan line is parallel to a first dimension (eg X) of the two dimensional array of pixels, and the second line is parallel to a second dimension (eg Y) of the two dimensional array of pixels. However, scanning could be performed in either order ie X then Y or Y then X, or scans may be interspersed. In this case estimating the location comprises separately estimating the location of the photodetector in the first dimension and estimating the location of the photodetector in the second dimension, each using equation (1).

However, this approach could be generalised and extended. In one embodiment, several estimates may be combined and averaged. Averaging could either be performed within each scan step (eg 3 intensity measurements taken and averaged at each scan step), or the scanning and centre of mass/weighted average estimation method could be repeated, and individual estimates obtained each using equation (1) could be averaged. Firstly, in the above example, each scan line had a width of one pixel. However, as the requirement is that the width of the line is less than the width of the photodetector, scan lines can be wider such as two pixels wide, three pixels wide or more (provided that the width constraint is still met). In the case of multi-pixel wide lines, the position (steppixelposition$_n$) of the line is the central position. In another embodiment, the two scan lines need not be aligned with an axis (of the projector), provided that the projected scan lines are orthogonal to each other. In this case (or even in the axis aligned case) the two dimensional (2D) pixel location ((x,y) in which whole number values are the centres of the projected pixels) can be jointly estimated using a regression (statistical) model, maximum likelihood, least squares, or other numerical or statistical estimation technique. Joint estimation can take into account the known orientations (eg $y=b_0+b_1 x$ where $b_0$ and $b_1$ are known for each scan line), the orthogonality constraint and the known width and scan step size (typically 1 pixel). In some embodiments, measurements from additional scans using scan lines at other angles (eg $b_0$ and $b_1$ selected so they are not orthogonal to either the first or second scan line) are could be taken and used in the joint estimation.

Figure 6A:
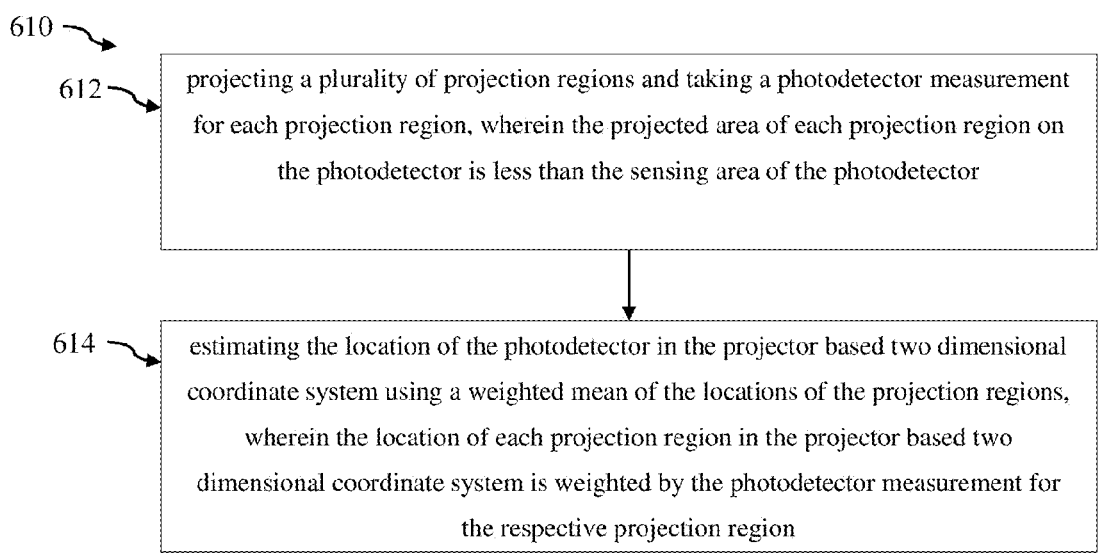
FIG. 6A is a flow chart of a method for estimating a location of a photodetector in a two dimensional array of pixels projected by a projector according to an embodiment.

More generally, the method outlined above can be extended by the projector projecting a plurality of projection regions (rather than projecting scan lines). These can be a line of pixels, which can be aligned or inclined with respect the projector axes, an elongated region approximating a line or rectangular (taking into account pixel borders), a rectangular blocks of pixel, or some other shape. The above described method can be generalised as illustrated in the flow chart 610 illustrated in FIG. 6A. The first step 612 of the method comprises projecting a plurality of projection regions and taking a photodetector measurement for each projection region. This is subject to the limitation that the projected area of each projection region on the photodetector is less than the sensing area of the photodetector. The next step 614 comprises estimating the location of the photodetector in the projector based two dimensional coordinate system using a weighted mean of the locations of the projection regions. The location of each projection region in the projector based two dimensional coordinate system is weighted by the photodetector measurement for the respective projection region.

The estimation step can be performed using all of the projection regions and associated measurements. This could be performed using range of estimation techniques such as a statistical (eg regression) model, optimisation technique such as a least squares or minimisation of an objective function which uses the weighted measurements. These estimation techniques may use other information, such as known size of the sensing area and approximate location. Estimation of the two dimensional position can be performed at the same time, or the position in each dimension could be separated estimated (eg X, then Y). Estimating the location of the photodetector can be performed in a similar manner to the method described above. One or more projected regions can be combined into a scanning set. Multiple scanning sets can be defined. A scanning line can be defined for each scanning set based upon the locations of the projected regions that comprise the scanning set. That is, the individual regions comprise to define a larger region (which can, but is not required to be, contiguous). This scanning set can effectively be a line of pixels. For each scanning set the combined projected area on the photodetector should still be less than the sensing area of the photodetector. Further, the photodetector measurements are combined to generate a photodetector set measurement. Individual measurements could be combined by summing the individual measurements. The individual measurements could be weighted by their area (in the two dimensional projector based coordinate system).

A plurality of scanning sets can then be combined to form two or more scanning collections. In each scanning collection, the scanning lines of the scanning sets forming the scanning collection are substantially parallel, and define a scanning direction line which is substantially orthogonal to the scanning lines. For each scanning collection, a measurement set location is defined for each scanning line in the scanning collection by the intersection of the scanning direction line with the respective scanning line. Estimating the location of the photodetector in the projector based two dimensional coordinate system is then performed using a weighted mean of the locations of the measurement set locations of a scanning collection, wherein the location of each measurement set location is weighted by the photodetector set measurement for the respective measurement set locations. Preferably the scanning collection should cover the photodetector in the direction of the scanning line (ie scanning direction line has no gaps, or any gaps are much smaller (eg <10%) than the width of the photodetector in the direction of the scanning line. For example, the scanning sets can be combined so they form a series of regularly spaced adjacent scanning lines which are separated by a scan step equal to the width of the each scanning set.

In one embodiment, two scanning collections are defined such that each scanning collection is aligned with one of the projection axes of the projector. That is, the scanning direction line of the first scanning collection is substantially parallel to the first axis of the projector based two dimensional coordinate system, and the scanning direction line of the second scanning collection is substantially parallel to a second axis of the projector based two dimensional coordinate system. The coordinate of the photodetector on the first axis is estimated from the measurement set locations and photodetector set measurements of the first scanning collection, and the coordinate of the photodetector on the second axis is estimated from the measurement set locations and photodetector set measurements of the second scanning collection. Equation (1) can be rewritten as:

$$mpp_i = \frac{\sum_{n=1}^{N} \text{measurement\_set\_location}_{n,i} * \text{photodetector\_set\_measurement}_n}{\sum_{n=1}^{N} \text{photodetector\_set\_measurement}_n} \quad (5)$$

where $mpp_i$ is the coordinate of the photodetector on the $i^{th}$ axis (i=1 or 2), measurement_set_location$_{n,i}$ is the $i^{th}$ coordinate of the measurement set location of the $n^{th}$ scanning set in the scanning collection, and photodetector_set_measurement$_n$ is the photodetector set measurement for the $n^{th}$ scanning set in the scanning collection, and N is the number of scanning sets in the scanning collection.

Figure 5D:
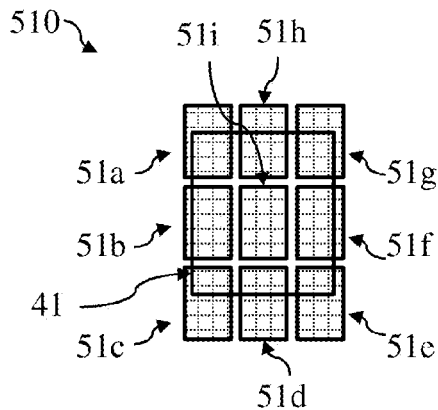
FIG. 5D illustrates projecting nine individual projection regions over a photodetector to form a projection set.
Figure 5E:
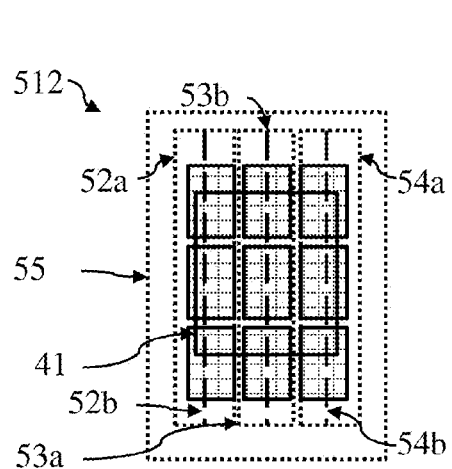
FIG. 5E illustrates grouping nine individual projections regions into three scanning groups which form a first scanning collection.
Figure 5F:
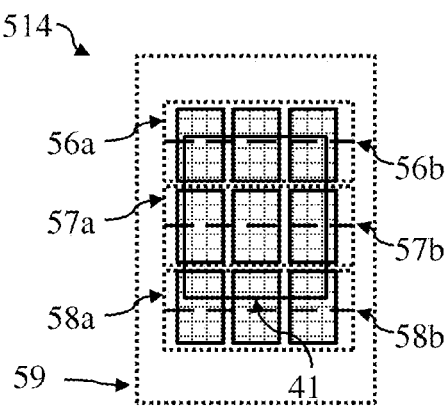
FIG. 5F illustrates grouping nine individual projections regions into another three scanning groups which form a second scanning collection.

Thus, in the method outlined above, each projection region is a line of pixels aligned with one of the axes of the two dimensional array of pixels and each line is a scanning set and each scanning collection is comprised of a plurality of projected lines separated by a scanning step in the scanning direction line. This is further illustrated in FIGS. 5D to 5F which are illustrations of grouping projection regions to form a projection sets and projection collections according to an embodiment. FIG. 5D is illustrates projecting 510 nine individual projection regions 51a to 51i over a photodetector 41. The projections could be projected in random order or in sequential scans. Each projection region has the same shape, and comprises multiple projector pixels. FIG. 5E illustrates grouping 512 the nine individual projections regions into three scanning groups 52a, 53a, and 54a, which form a first scanning collection 55. Scanning group 52a comprises projection regions 51a, 51b, and 51c, with scan line 52b. Scanning group 53a comprises projection regions 51d, 51h, 51i, with scan line 53b. Scanning group 54a comprises projection regions 51e, 51f, and 51g with scan line 54b. FIG. 5F illustrates grouping 514 the nine individual projections regions into another three scanning groups 56a, 57a, and 58a, which form a second scanning collection 59. Scanning group 56a comprises projection regions 51a, 51h, 51g, with scan line 56b. Scanning group 57a comprises projection regions 51b, 51i, and 51f, with scan line 57b. Scanning group 58a comprises projection regions 51c, 51d, and 51e with scan line 58b. The first scanning collection can be used to estimate the X coordinate and the second scanning collection can be used to estimate the Y coordinate.

Figure 6B:
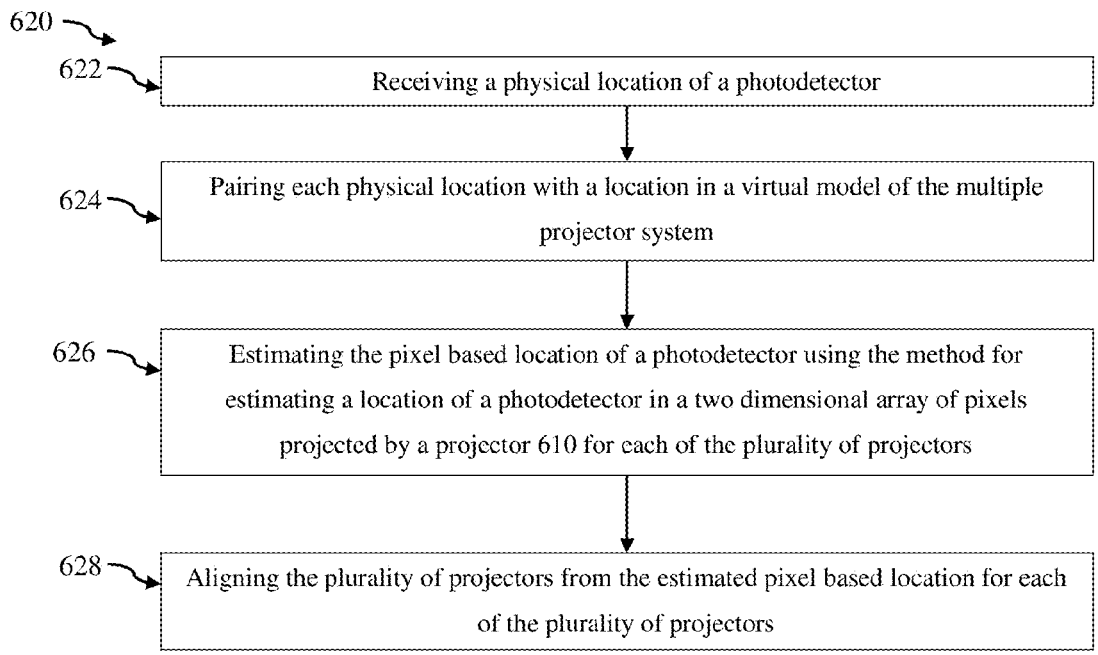
FIG. 6B is a flow chart of a method for calibrating a spatial augmented reality (SAR) system to align a plurality of projectors according to an embodiment.

By placing the photodetector sensors at known locations on a target object, a projector calibration can be performed that can take advantage of the sub-pixel accuracy estimates of photodetector location(s) obtained using the above method. The improved position estimates can be utilised to improve the calibration process for multiprojector alignment compared to a system using point photo detectors. FIG. 6B is a flowchart of a method 620 for calibrating a spatial augmented reality (SAR) system to align a plurality of projectors. The method comprises the steps of receiving a physical location of a photodetector 622; pairing each physical location with a location in a virtual model of the SAR system 624; estimating the pixel based location of a photodetector using the method for estimating a location of a photodetector in a two dimensional array of pixels projected by a projector 610 for each of the plurality of projectors 626; and aligning the plurality of projectors from the estimated pixel based location for each of the plurality of projectors 628.

The first step is to place the photo detector modules or nodes at known locations in the field of view of the projector. Placing them on the projection targets as a reference is a good approach, because CAD models, or other digital/computer models (eg based on scanning an object, or otherwise generating or obtaining a model), which we will collectively refer to as CAD models, for these objects already exist. This makes finding suitable positions easier, as the coordinates can be taken from the CAD model, rather than performing manual measurements of the environment. The accuracy of photo detector placement affects the quality of the registration between the object and projected appearance. However, the multiple projector alignment is not actually affected by placement since it is only relative alignment that is required and not absolute accuracy of photodetector positions in the physical (or virtual) space (ie physical coordinate or virtual coordinate systems). For example, a slightly mis-placed sensor will leave an unprojected white seam on the edge of an object but this will not create a shadowing affect that results from two mis-aligned projectors. If incorrect positions (in the world, or virtual coordinate system) are recorded, positions can be remeasured after final placement and the coordinates manually updated optimise the appearance, or an automated procedure could be utilised to adjust the coordinates to reduce shadowing and optimise the appearance.

Once the sensors have been placed, the calibration algorithm can be performed. The algorithm described above finds the projector locations for each sensor. These locations are paired with the 3D locations taken from the CAD model, and the projector calibration is calculated. This process can be repeated for any number of projectors. The step of aligning thus comprises adjusting at least one extrinsic parameter of at least one of the plurality of projectors. The at least one extrinsic parameter may comprise a position and orientation of the projector in the virtual model of the SAR system.

Further, the calibration can be performed continuously during use of the SAR system to maintain alignment of the plurality of photodetectors. For example as users use the system, they may accidentally bump objects and/or projection surfaces may move slightly when users are pretending to press simulated the controls. Therefore once the projectors are calibrated, the system may be placed into a real-time updating mode to continuously adjust for such small changes. This entails the system performing continuous scan line projection over the photodetectors (and processing of light intensity measurements). This real-time updating allows for the system to correct for small movements of the physical object. This requires the movements to be small enough to keep the photo detectors within the region of the scan lines. If the move is too great, the system can perform a complete re-calibration.

The performance of the method for estimating the photodetector location described above using embodiment of the planar photodetector described above and illustrated in FIG. 3D was compared to the performance of a point size photo detector using the Gray-coding algorithm. The testing included evaluation of experimental parameters including the effect of the physical environment, light intensity parameters of projected pixels, the procedure and the performance results were evaluated.

Figure 7:
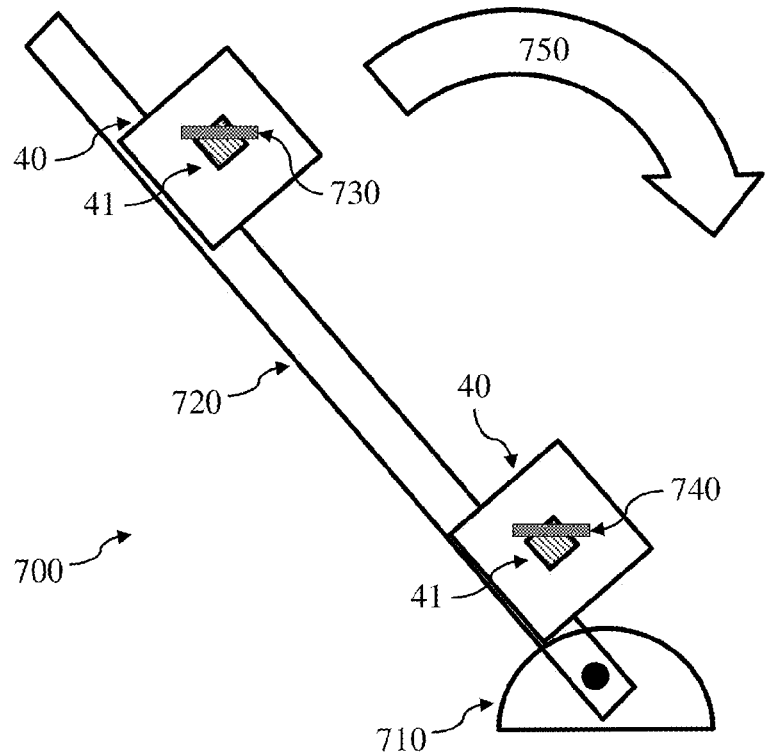
FIG. 7 is an illustration of an apparatus for testing the photodetector.

To provide a suitable physical testing environment a projected volume was generated with a computer controlled rotary table (Sherline P/N 870) to precisely move photo detector nodes and measure/record their position. The Sherline rotary table provides 28800 step positions per revolution or 0.0125 degrees per step. FIG. 7 shows the apparatus 700 comprising of a precise computer controlled rotary table 710 and photo detector nodes 40 attached to the arm 720 of the rotary table which was all placed in a projected volume. Each photo detector node was moved in a counter clockwise circular motion (arrow 750) and the known location recorded and compared with the detected location. The photo detectors nodes 40 were placed with fixed relative position to each other on the arm connected to the rotary table. With this motion, each photo detector path presents all angles to the projected pixels 'X' and 'Y' axes as it is rotated. A NEC NP510W projector with a 4 meter projection distance was used, which in this configuration generated pixels which were approximately 1.5 mm wide at the photodetectors. The projector was used to projects scan lines 730 740 which in this figure are just above the planar photo diode sensors 41.

In some cases it was noted that the NEC NP510W projector would not provide a consistent light intensity when a single pixel, or a line with a one-pixel width was displayed, and the colour and position of the pixel would flicker inconsistently. To avoid this problem, a scan line with a width of two pixels was used. Hardware keystone was also disabled to prevent unwanted warping effects.

Figure 8:
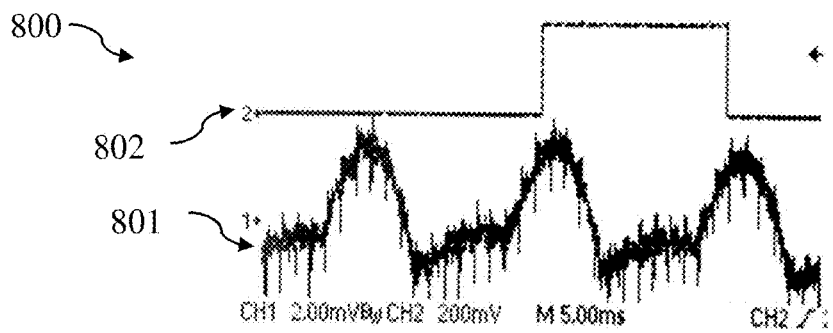
FIG. 8 is screenshot of oscilloscope traces.

The sub-pixel algorithm also makes the assumption that the light levels of the projected pixels are constant over time, making the algorithm sensitive to short term intrinsic light level variations. In preparation for the evaluation, we measured the response of the photo detector under projected light to capture the internal characteristics of the projector. The photodetector signal was measured to show an approximately 60 Hz frequency ripple signal, ie a 16.6 ms (1/60 Hz) periodicity. FIG. 8 shows a screenshot 800 of oscilloscope traces. A first trace 801 is a trace of the output level of the photo detector and the second trace 802 is a 16.6 ms interval/square wave (16.6 ms=1/60 Hz). We used this parameter to synchronize the measurement with an interval of approximately 16.6 mS to optimize the sub-pixel location calculation.

The following process was performed with the two photo detector hardware systems, namely a point sized photo detector and the planar photo detector:

1. Perform Gray-code to locate photo detectors with an approximate position;
2. Perform sub-pixel calibration algorithm with horizontal and vertical scan lines (planar photo detector only);
3. Record position of photo detector relative to pixels;
4. Rotate the photo detector in a circular motion by 1 degree on the computer controlled arm;
5. Return to step 2 and repeat.

Figure 9A:
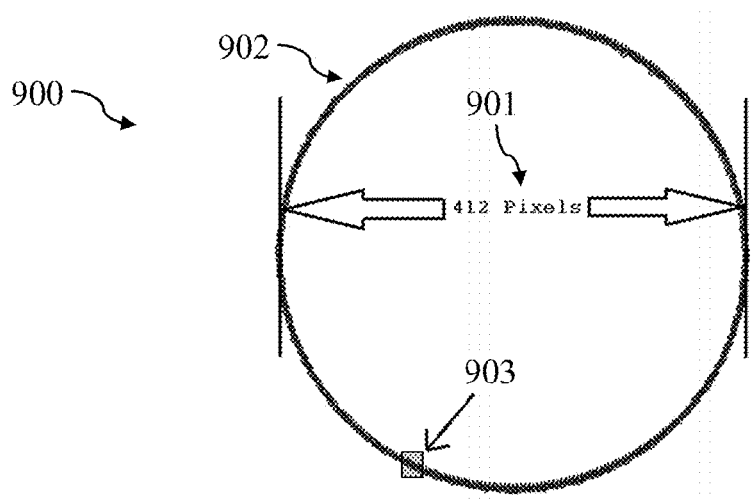
FIG. 9A is a plot of the actual and estimated paths of a point sized and planar photo detectors using the apparatus of FIG. 7.
Figure 9B:
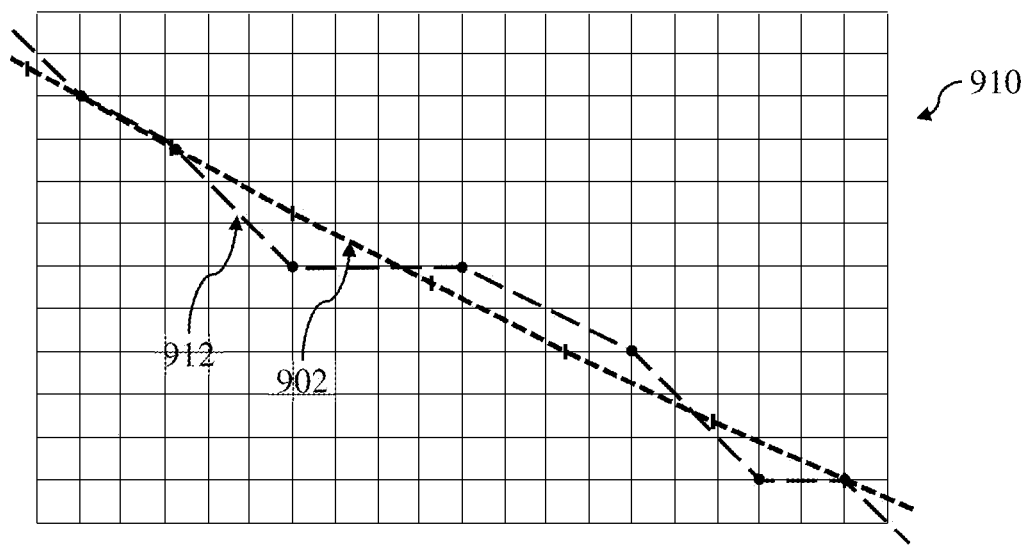
FIG. 9B is a close-up of the actual path and estimated path using a point size photodetector and structured light position estimation.
Figure 9C:
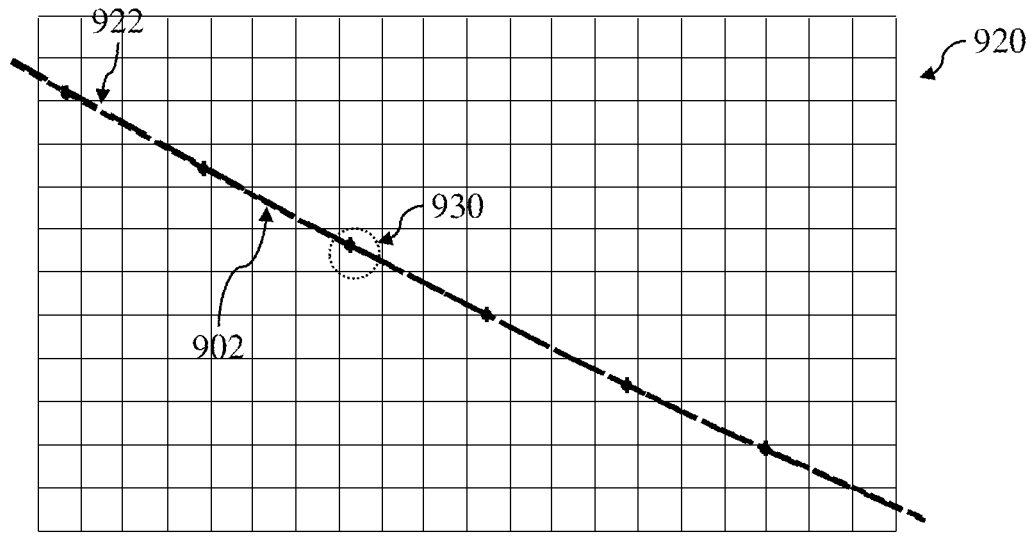
FIG. 9C is a close-up of the actual path and estimated path using a planar photodetector and position estimation method described herein.
Figure 9D:
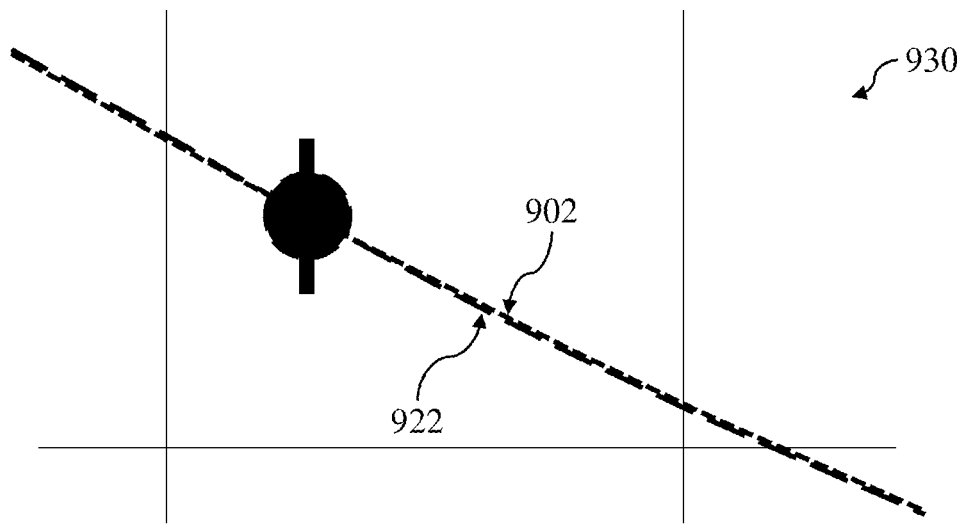
FIG. 9D is a further close-up of the actual path and estimated path of FIG. 9C using a planar photodetector and position estimation method described herein.

With the detectors installed on the rotating apparatus the position was repeatedly recorded while moving the detectors in a circular motion. The above steps were performed 360 times (one revolution) to gather the data for the performance analysis. The sub pixel estimation method (algorithm) described above was also applied for the planar photo detector. The data gathered from both the point sized and planar photo detectors is shown in FIG. 9A. FIG. 9A is a plot 900 of the actual path 902 overlaid with the estimated paths of a point sized and planar photo detectors using the apparatus of FIG. 7 over the full 360°. For the projector/detector separation, the circular path has a diameter 901 of 412 pixels. At this scale the difference between the estimates paths using point size and planar detectors is not apparent, and thus to clearly identify the performance we provide a zoomed in section 903 on the graph for both the point and planar photo detectors. FIG. 9B shows a plot 910 of section 903 displaying both the actual/ideal path (short dash black line with tick marks) 902 and the measured path (long dashed line with circles) 912 using a point sized photo detector. The grid intersections represent pixel centres at the detector. As expected the stair stepped line 912 of the measured path demonstrates the pixel level accuracy (X SD=0.667 Y SD=0.818). FIG. 9C shows a plot 920 of both the ideal path (short dashed black line with tick marks) 902 and the measured path (long dashed black line with circles) 922 using a planar photo detector. The increased accuracy can be identified visually with the paths overlapping. This is further illustrated in zoomed in section 930, shown in FIG. 9D, that further show the increased accuracy, and thus demonstrate an order of magnitude improvement (in this case over 20 times) which can be seen by comparing the standard deviation (X SD=0.029 Y SD=0.037) with those for the point based photodetectors and standard Gray-code algorithm.

Figure 10A:
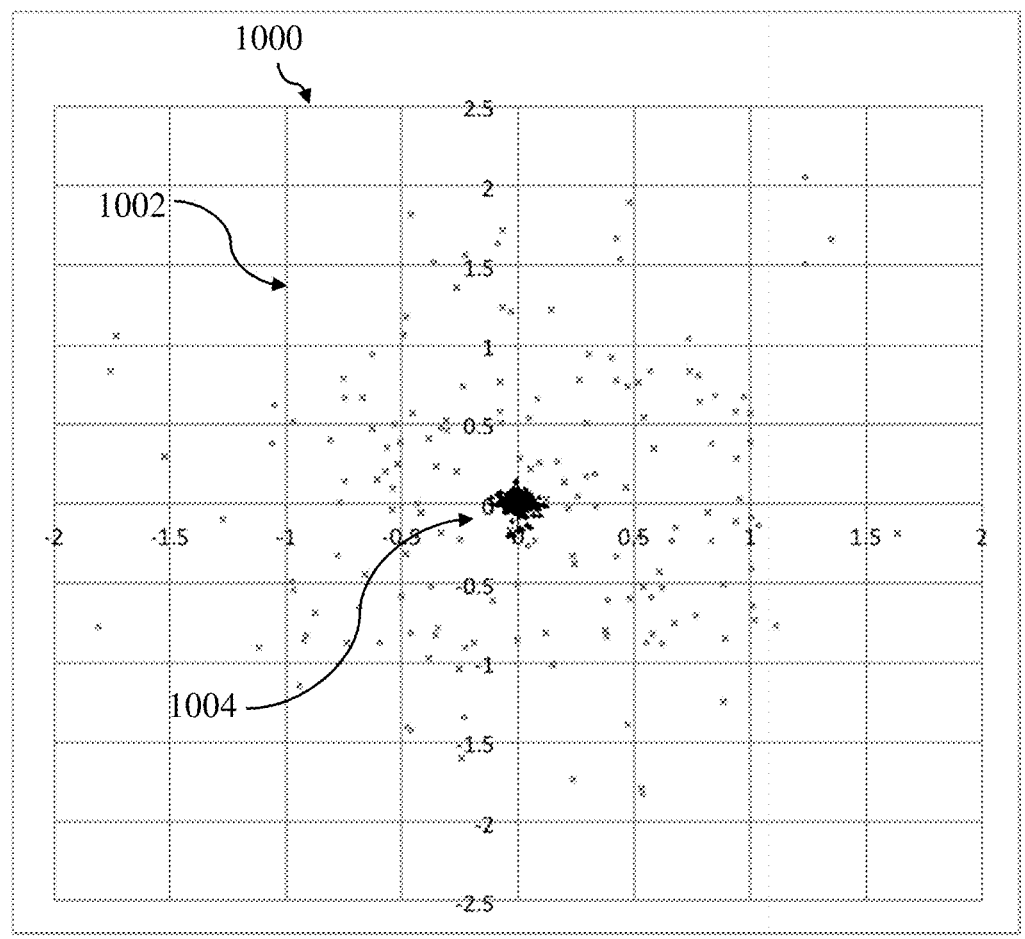
FIG. 10A is a plot of the error term for a point photodetector and structured light position estimation and a planar photodetector and position estimation method described herein.
Figure 10B:
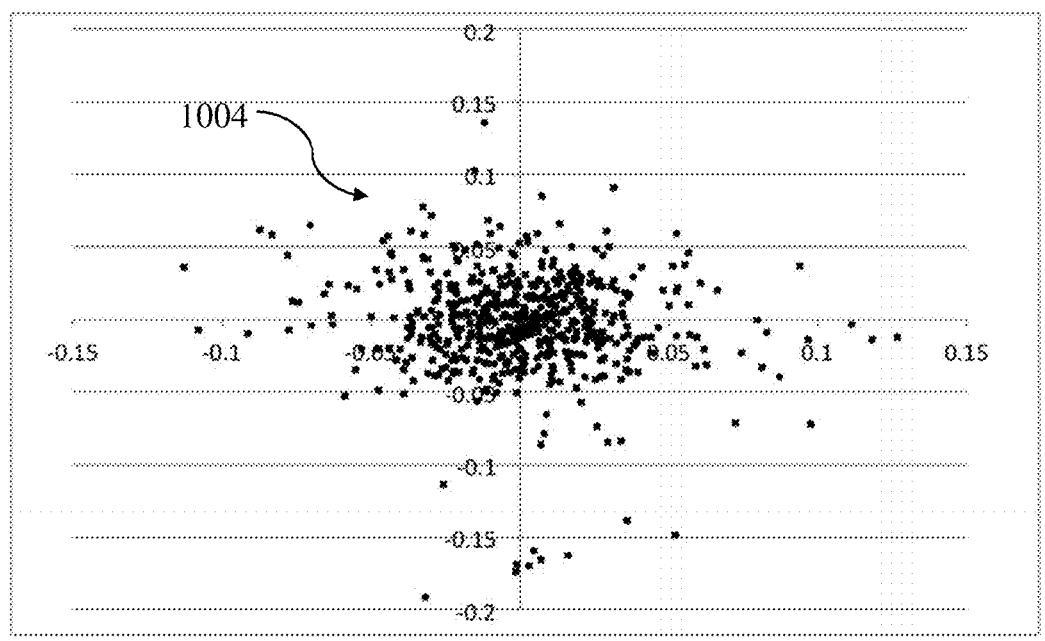
FIG. 10B is a zoomed in plot of the error term for a planar photodetector and position estimation method described herein.

The data recorded during the evaluation procedure was further analysed to find the error term (or deviation) between the actual position and the measured position in pixels. FIG. 10A is a plot 1000 of the error term for a point photodetector and structured light position estimation, shown as grey crosses 1002, and a planar photodetector and position estimation method described herein, shown as black squares 1004. The planar photo detector points are clustered in the centre of the plot whilst the point photo detector points show significant deviation from the actual position. FIG. 10B shows a zoomed in section of FIG. 10A with the scale adjusted to be fractions of a pixel and showing only the planar photo detector error terms (black dots) which are clustered around (0,0). This clearly indicates the order of magnitude improvement obtained with a planar photodetector and the estimation method described above.

Figure 11A:
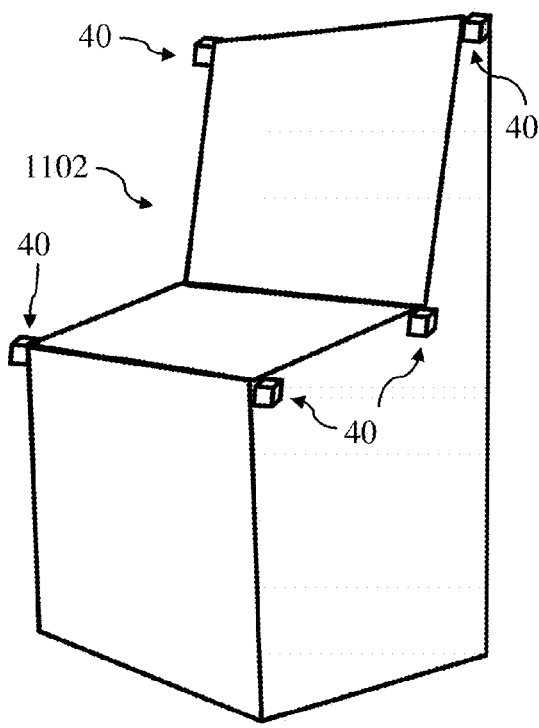
FIG. 11A shows a white mock-up of a console with photo detector modules (nodes) attached (mounted) at various locations.
Figure 11B:
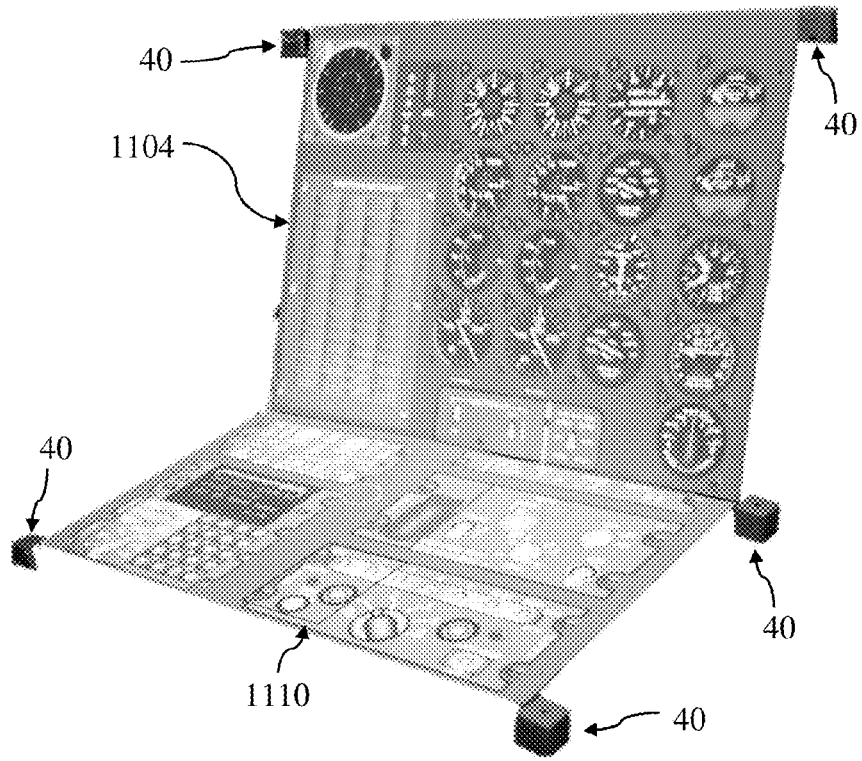
FIG. 11B shows a photograph of a calibrated multi projector projection of a user interface projected onto a physical embodiment of the console mock up shown in FIG. 11A.
Figure 11C:
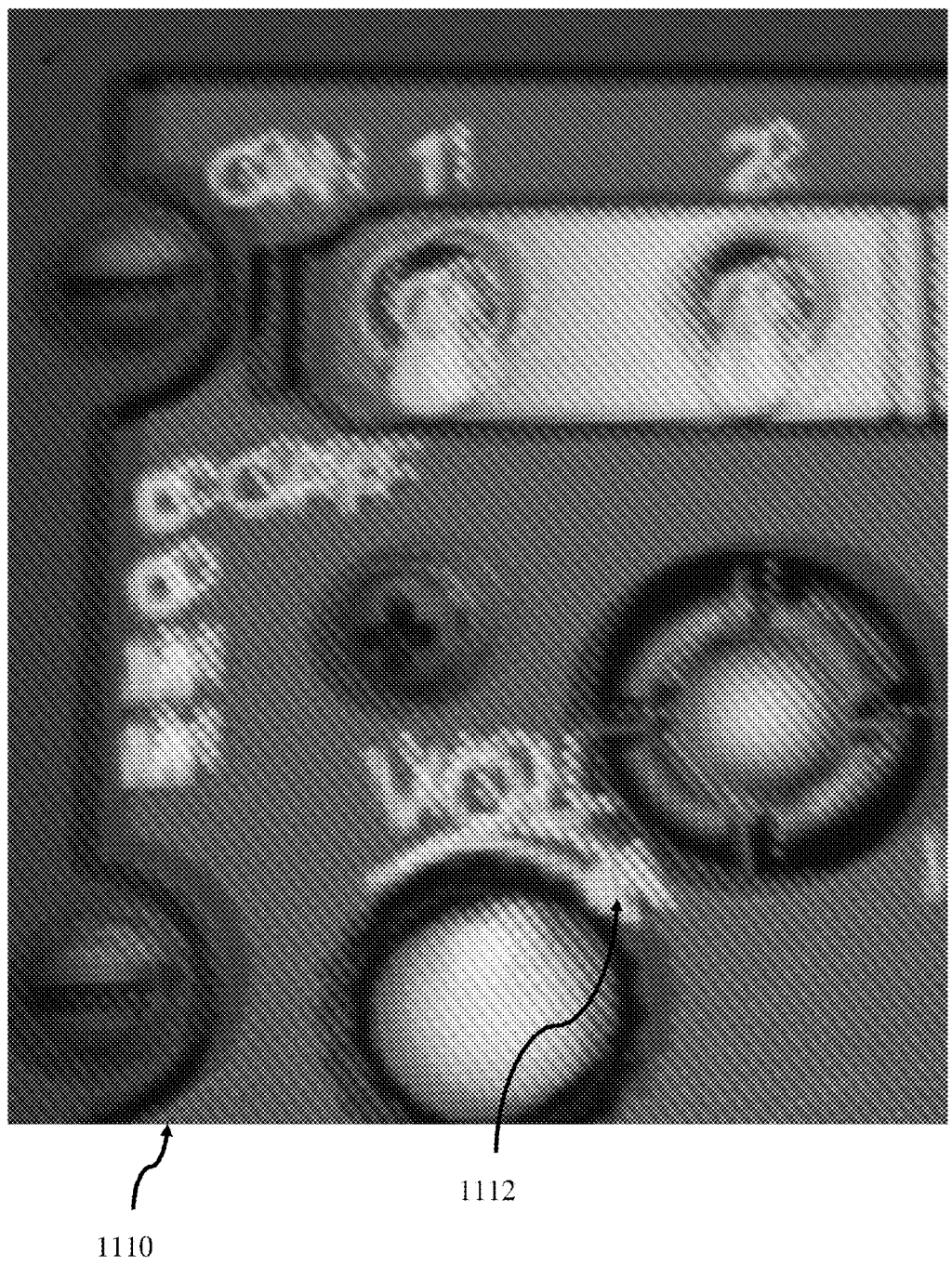
FIG. 11C shows a photograph of the calibration results with two projectors onto a physical embodiment of the console shown in FIG. 11A using a planar photodetector and structured light position.
Figure 11D:
FIG. 11D shows a photograph of the calibration results with two projectors onto a physical embodiment of the console shown in FIG. 11A using a planar photodetector and position estimation method described herein.

FIG. 11A shows a white mock-up of a console 1102 with photo detector modules (nodes) attached (mounted) at various locations and FIG. 11B shows a photograph of the calibrated multi projector projection 1104 of a user interface onto the console mock up 1102 shown in FIG. 11A. A close up region 1110 is marked on FIG. 11B and FIGS. 11C and 11D shows the calibration results with two projectors on this console mock up for this region 1110 using the two different estimation techniques. FIG. 11C shows region 1110 with two projectors calibrated using the Gray-coding calibration step using planar photodetector (ie multi-pixel level accuracy). At this stage the two projected images are poorly aligned, with the two projected images forming a ghosting effect on the object's surface with a pixel mis-alignment of up to 3 pixels. This can be seen in feature 112 which shows a ghosted arrow and "VOL" text. FIG. 11D shows region 1110 after the fine calibration step has been completed to obtain sub pixel accuracy. Here, the projected images are much more closely aligned and no ghosting is noticeable in arrow 1114 and "VOL" text.

The photodetector modules or nodes, sub pixel location estimates and calibration methods may be put to several other uses. The system may be used for alignment of multi projector display walls. The projectors may be used to calibrate object positions in a SAR environment and this may be used to build up a virtual model of a physical object in the SAR environment. A projector-to-object calibration in a single volume can be performed in which each photo detector node can be seen by all projectors. In another embodiment, a portable SAR system may be deployed in a factory in which maintenance information is to be projected onto a piece of equipment. The calibration cubes (photodetector modules) are placed at ad hoc locations into the projection volume. The spatial relationship between the cubes and a 3D model of the equipment is established, and this allows the projection volume to be calibrated to the piece of equipment. Another scenario is the calibration of a large empty volume for industrial designers to visualize commercial designs. Calibration cubes (photodetector modules) are placed at known heights and locations within the projection volume, for example by using a set of known length rods. The configuration of the rods specifies the 3D relationship between the calibration cubes and is translated into a 3 space points defining the locations of the calibration cubes. The system can now calibrate the volume to a known origin. Now objects placed or tracked relative to this origin are known to the SAR system, and the system is calibrated correctly.

As was noted above, the maximum pixel size is limited to the area of the photo detector. In the embodiment illustrated in FIGS. 3A to 3D the photo detector has a 21.4 sq mm area, however, this could easily be reduced or increased to match smaller and larger projected pixels respectively. The achievable resolution is limited by the pixel light level behaviour of the projector and will vary with different brands. Variations in pixel characteristics also change over time. For example, the temperature of the projector's internal components stabilize over tens of minutes and the performance increases. Further, the consistency of the light intensity projected when a single pixel, or a line with a one-pixel width is projected can vary and thus in some cases the use of multipixel wide lines (eg two pixels) can be utilised. Alternatively, several samples with single pixels lines may be collected and averaged. It is also noted that the method requires measuring the variation in light levels, received by the sensor as the scanning method progresses. Thus, in some cases, the algorithm can be sensitive to other sources of light level variations. The method can also be sensitive to short term ambient light level fluctuations such as a 100 Hz that will be present from incandescent light globes powered by a 50 Hz mains cycle. This source of measurement noise may be controlled by reducing ambient lighting, by averaging measurements over an interval that matches the fundamental frequency of the noise source, or by synchronising measurements to the source of the noise.

Embodiments of a photodetector projector calibration system that provides sub-pixel measurement have been described. These embodiments build upon existing calibration methods that employ point-based photo detectors by advancing the hardware with a larger surface area photo detector to locate sub-pixel position with light intensity data. The data from this new photodetector (or calibration cube) is used to expand the structured light based estimation methods such as the Gray-coding algorithm to improve the position measurement. The novel hardware and associated method allows a sub-pixel position to be calculated and this is leveraged to improve alignment of multiple-projector environments. The results show the new approach improves position measurement from pixel accuracy using a point photo detector with Gray-code algorithm by an order of magnitude providing sub-pixel accuracy by leveraging the planar photo detector and additional algorithm steps. Further this estimation method may be used to improve the alignment of overlapping images of multiple projectors in order to achieve higher quality cross calibration of multiple projectors used for a 3D projected (SAR) environment. This technique will assist with real world measurement accuracy by enabling the intrinsic and extrinsic characteristic of projectors to be measured with higher accuracy. The calibration method can further be performed in real time (or near real time) so that they system can make fine adjustments to correct the appearance in real-time (or near real time) to ensure alignment is maintained as users, surfaces, and/or photodetectors move or are bumped.

The calibration algorithm is implemented on or executed by a computer or computing system that typically comprises a display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. An embodiment of a computing device 10 comprises a central processing unit (CPU), a memory, a display apparatus, and may include an input device such as keyboard, mouse, etc. The CPU comprises an Input/Output Interface, an Arithmetic and Logic Unit (ALU) and a Control Unit and Program Counter element which is in communication with input and output devices (eg input device and display apparatus) through the Input/Output Interface. The Input/Output Interface may comprise a network interface and/or communications module for communicating with an equivalent communications module in another device using a predefined communications protocol (eg Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core). The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules that can be loaded and executed by the processor(s).

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers. Further, the term "or" is intended to mean an inclusive "or" rather than an exclusive "or." That is, unless specified otherwise, or clear from the context, the phrase "X uses A or B" is intended to mean any of the natural inclusive permutations. That is, the phrase "X uses A or B" is satisfied by any of the following instances: X uses A; X uses B; or X uses both A and B. In addition, the articles "a" and "an" as used in this application and the appended claims should generally be construed to mean "one or more" unless specified otherwise or clear from the context to be directed to a singular form The reference to any prior art in this specification is not, and should not be taken as, an acknowledgement of any form of suggestion that such prior art forms part of the common general knowledge, or is well known in the field.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A method for estimating a location of a photodetector in a projector based two dimensional coordinate system, the projector projecting a two dimensional array of pixels and the photodetector comprising a sensing area, the method comprising:
projecting a plurality of projection regions from the projector, and taking a photodetector measurement for each projection region, wherein the projected area of each projection region on the photodetector is less than the sensing area of the photodetector; and
estimating the location of the photodetector in the projector based two dimensional coordinate system using a weighted mean of the locations of the projection regions, wherein the location of each projection region in the projector based two dimensional system is weighted by the photodetector measurement for the respective projection region.

2. The method as claimed in claim 1, wherein estimating the location of the photodetector further comprises the step of combining one or more of the plurality of projected regions into one or more scanning set, wherein a scanning line for each scanning set is defined based upon the locations of the one or more of the projected regions comprising the scanning set, and the combined projected area on the photodetector is less than the sensing area of the photodetector, and the photodetector measurements are combined to generate a photodetector set measurement.

3. The method as claimed in claim 2, wherein estimating the location of the photodetector further comprises the step of combining a plurality of scanning sets to form two or more scanning collections, wherein for each scanning collection, the scanning lines of the scanning sets forming the scanning collection are substantially parallel, and define a scanning direction line which is substantially orthogonal to the scanning lines.

4. The method as claimed in claim 3, wherein for each scanning collection, a measurement set location is defined for each scanning line in the scanning collection by the intersection of the scanning direction line with the respective scanning line.

5. The method as claimed in claim 3, wherein estimating the location of the photodetector in the projector based two dimensional coordinate system is performed using a weighted mean of the locations of the measurement set locations of a scanning collection, wherein the location of each measurement set location is weighted by the photodetector set measurement for the respective measurement set locations.

6. The method as claimed in claim 5, wherein the two or more scanning collections include a first scanning collection and a second scanning collection, and the scanning direction line of the first scanning collection is substantially parallel to a first axis of the projector based two dimensional coordinate system, and the scanning direction line of the second scanning collection is substantially parallel to a second axis of the projector based two dimensional coordinate system, and the coordinate of the photodetector on the first axis is estimated from the measurement set locations and photodetector set measurements of the first scanning collection, and the coordinate of the photodetector on the second axis is estimated from the measurement set locations and photodetector set measurements of the second scanning collection.

7. The method as claimed in claim 6, wherein each projection region is a line of pixels aligned with one of the axes of the two dimensional array of pixels and each line is a scanning set and each scanning collection is comprised of a plurality of projected lines separated by a scanning step in the scanning direction line.

8. The method as claimed in claim 7, wherein the coordinate of the photodetector on the $i^{th}$ axis, where the $i^{th}$ axis is the first axis or the second axis, is obtained using the equation:

$$mpp_i = \frac{\sum_{n=1}^{N} \text{measurement\_set\_location}_{n,i} * \text{photodetector\_set\_measurement}_n}{\sum_{n=1}^{N} \text{photodetector\_set\_measurement}_n}$$

where $mpp_i$ is the coordinate of the photodetector on the $i^{th}$ axis, measurement\_set\_location$_{n,i}$ is the $i^{th}$ coordinate of the measurement set location of the $n^{th}$ scanning set in the scanning collection, and photodetector\_set\_measurement$_n$ is the photodetector set measurement for the $n^{th}$ scanning set in the scanning collection, and N is the number of scanning sets in the scanning collection.

9. The method as claimed in claim 7, further comprising a step of obtaining a coarse estimate of the photodetector location prior to the step of projecting a plurality of projection regions, and each scanning collection is obtained by projecting a plurality of lines over a range from a start pixel location to an end pixel location, wherein the start pixel location is a pixel location estimated from the coarse location to be before the edge of the photodetector and the end pixel location is a pixel location estimated from the coarse location to be after an opposite edge of the photodetector.

10. The method as claimed claim 1, further comprising the step of background correcting the photodetector measurements, wherein the step of background correcting the photodetector measurements comprises:

measuring one or more background light measurements when the photodetector is not illuminated by the projector to obtain a background estimate; and subtracting the background estimate from each photodetector measurement.

11. The method as claimed claim 1, wherein the estimated location of the photodetector is the centroid of the sensing area.

12. The method as claimed in claim 1, wherein at least one of the plurality of projection regions partially illuminates the sensing area.

13. The method as claimed in claim 1, wherein the photodetector is a composite photodetector comprised of a plurality of light sensing elements, the projected area of each projection region on the photodetector is less than the sensing area of each light sensing element.

14. The method as claimed in claim 1, wherein the photodetector is a composite photodetector comprised of a plurality of light sensing elements, wherein the gap between each of the light sensing elements is less than 10% of the width of the projected area of each projection region on the photodetector.

15. A method for calibrating a multiple projector system to align a plurality of projectors, the method comprising:

receiving a physical location of at least one photodetector;

pairing each physical location with a location in a virtual model of the multiple projector system;

estimating the pixel based location of each the at least one photodetector for each of the plurality of projectors using the method as claimed in claim 1 for each of the plurality of projectors; and aligning the plurality of projectors from the estimated pixel based location for each of the plurality of projectors.

16. The method as claimed in claim 15, wherein the step of aligning comprises adjusting at least one extrinsic parameter of at least one of the plurality of projectors.

17. The method as claimed in claim 16, wherein the at least one extrinsic parameter comprises a position and orientation of the projector in the virtual model of the multiple projector system.

18. The method as claimed in claim 17, wherein the calibration is performed continuously during use of the multiple projector system to maintain alignment of the plurality of photodetectors.

19. The method as claimed in claim 18, wherein the multiple projector system is a spatial augmented reality (SAR) system.

20. A non transitory processor readable medium comprising instructions for causing at least one processor to perform a method for estimating a location of a photodetector in a projector based two dimensional coordinate system, the projector projecting a two dimensional array of pixels and the photodetector comprising a sensing area, the method comprising:

projecting a plurality of projection regions from the projector, and taking a photodetector measurement for each projection region, wherein the projected area of each projection region on the photodetector is less than the sensing area of the photodetector; and estimating the location of the photodetector in the projector based two dimensional coordinate system using a weighted mean of the locations of the projection regions, wherein the location of each projection region in the projector based two dimensional coordinate system is weighted by the photodetector measurement for the respective projection region.

21. The non-transitory processor readable medium as claimed in claim 20, further comprising instructions for causing at least one processor to perform a method for calibrating a multiple projector system to align a plurality of projectors, the method comprising:
  receiving a physical location of at least one photodetector;
  pairing each physical location with a location in a virtual model of the multiple projector system;
  estimating the pixel based location of the at least one photodetector for each of the plurality of projectors using the method for estimating a location of a photodetector in a projector based two dimensional coordinate system for each of the plurality of projectors; and
  aligning the plurality of projectors from the estimated pixel based location for each of the plurality of projectors.

22. A system for estimating a location of a photodetector in a projector based two dimensional coordinate system, the system comprising:
  a projector wherein the projector projects a two dimensional array of pixels;
  at least one photodetector comprising a sensing area; and
  a computing apparatus comprising at least one processor and a memory, the memory comprising instructions to perform a method for estimating a location of each of the at least one photodetector in a projector based two dimensional coordinate system, the method comprising:
    projecting a plurality of projection regions from the projector, and taking a photodetector measurement for each projection region, wherein the projected area of each projection region on the photodetector is less than the sensing area of the photodetector; and
    estimating the location of the photodetector in the projector based two dimensional coordinate system using a weighted mean of the locations of the projection regions, wherein the location of each projection region in the projector based two dimensional coordinate system is weighted by the photodetector measurement for the respective projection region.

23. The system as claimed in claim 22, wherein the photodetector comprises:
  a housing;
  a light sensor comprising a sensing area;
  a signal processing module for generating a measurement from the light sensor;
  a power supply module; and
  a communications module.

24. The system as claimed in claim 22, wherein the system further comprises a plurality of projectors wherein each projector projects a two dimensional array of pixels, and the memory further comprises instructions to perform a method for calibrating a multiple projector system to align a plurality of projectors, the method comprising:
  receiving a physical location of each of the at least one photodetector;
  pairing each physical location with a location in a virtual model of the multiple projector system;
  estimating the pixel based location of each of the at least one photodetectors for each of the plurality of projectors using the method for estimating a location of a photodetector in a projector based two dimensional coordinate system for each of the plurality of projectors;
  aligning the plurality of projectors from the estimated pixel based location for each of the plurality of projectors.

* * * * *

UNITED STATES PATENT AND TRADEMARK OFFICE
CERTIFICATE OF CORRECTION

PATENT NO. : 9,547,222 B2
APPLICATION NO. : 14/174109
DATED : January 17, 2017
INVENTOR(S) : Ross Travers Smith et al.

Page 1 of 1

It is certified that error appears in the above-identified patent and that said Letters Patent is hereby corrected as shown below:

In the Claims

Column 23, Line 64, Claim 10, after "claimed" insert -- in --

Column 24, Line 6, Claim 11, after "claimed" insert -- in --

Column 24, Line 49, Claim 20, delete "non transitory" and insert -- non-transitory --

Signed and Sealed this
Fifth Day of September, 2017

Joseph Matal
*Performing the Functions and Duties of the
Under Secretary of Commerce for Intellectual Property and
Director of the United States Patent and Trademark Office*